United States Patent
Kasatani

(10) Patent No.: US 9,294,533 B2
(45) Date of Patent: Mar. 22, 2016

(54) DISTRIBUTION CONTROL, METHOD AND SYSTEM FOR CHANGING A PARAMETER OF REPRODUCTION QUALITY AT A COMMUNICATION TERMINAL BASED ON THE RECEIVED TRANSMISSION DELAY TIME INFORMATION

(71) Applicant: Kiyoshi Kasatani, Kanagawa (JP)

(72) Inventor: Kiyoshi Kasatani, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/207,788

(22) Filed: Mar. 13, 2014

(65) Prior Publication Data

US 2014/0282793 A1    Sep. 18, 2014

(30) Foreign Application Priority Data

Mar. 15, 2013 (JP) ................. 2013-054413
Oct. 1, 2013 (JP) ................. 2013-206406
Jan. 14, 2014 (JP) ................. 2014-004186
Feb. 21, 2014 (JP) ................. 2014-031507

(51) Int. Cl.
*H04N 7/173* (2011.01)
*H04N 11/20* (2006.01)
(Continued)

(52) U.S. Cl.
CPC .......... *H04L 65/604* (2013.01); *H04L 43/0858* (2013.01); *H04L 65/4084* (2013.01);
(Continued)

(58) Field of Classification Search
CPC ..... H04N 21/20; H04N 21/25; H04N 21/262; H04N 21/26208; H04N 21/26216; H04N 21/26233; H04N 21/26283; H04N 21/2662; H04N 21/42607; H04N 21/6373; H04N 21/6379; H04N 21/64738; H04N 21/64746; H04N 21/64753; H04N 21/64761; H04N 21/64769
USPC ........... 725/116; 709/217; 348/441, 443, 444, 348/445, 450, 457
See application file for complete search history.

(56) References Cited

U.S. PATENT DOCUMENTS 5,991,811 A    11/1999 Ueno et al.
6,438,596 B1    8/2002 Ueno et al.
(Continued)

FOREIGN PATENT DOCUMENTS

JP    3824606    7/2006
JP    2008-225516    9/2008
(Continued)

OTHER PUBLICATIONS

Extended European Search Report for corresponding EP Application No. 14159142.0, dated Dec. 9, 2014.
(Continued)

*Primary Examiner* — Hoang-Vu A Nguyen-Ba
(74) *Attorney, Agent, or Firm* — Harness, Dickey & Pierce, P.L.C.

(57) ABSTRACT

A distribution control system distributes data to a communication terminal through a communication network. The distribution control system includes a receiver configured to receive, from the communication terminal, transmission delay time information indicating transmission delay time from when the data is distributed by the distribution control system to when the data is received by the communication terminal; and a changing unit configured to change, based on the transmission delay time information received by the receiver, a parameter of reproduction quality when the data is reproduced by the communication terminal.

10 Claims, 23 Drawing Sheets

(51) Int. Cl.
*H04L 29/06* (2006.01)
*H04N 21/2343* (2011.01)
*H04N 21/262* (2011.01)
*H04N 21/6547* (2011.01)
*H04L 12/26* (2006.01)
*G06F 15/16* (2006.01)

(52) U.S. Cl.
CPC .............. *H04L65/602* (2013.01); *H04L 65/80* (2013.01); *H04N 21/2343* (2013.01); *H04N 21/2625* (2013.01); *H04N 21/6547* (2013.01)

(56) References Cited

U.S. PATENT DOCUMENTS

| | | | |
|---|---|---|---|
| 7,984,179 B1* | 7/2011 | Huang | 709/233 |
| 8,078,694 B2 | 12/2011 | Barton et al. | |
| 8,127,233 B2 | 2/2012 | McDowell | |
| 8,254,704 B2 | 8/2012 | Lu et al. | |
| 2004/0083488 A1* | 4/2004 | Fukuda et al. | 725/38 |
| 2006/0031914 A1* | 2/2006 | Dakss et al. | 725/135 |
| 2006/0070111 A1* | 3/2006 | Kurosawa | 725/105 |
| 2007/0192509 A1 | 8/2007 | Ohtsuka et al. | |
| 2008/0069005 A1* | 3/2008 | von Eicken et al. | 370/252 |
| 2008/0071905 A1* | 3/2008 | Sullivan et al. | 709/224 |
| 2008/0109865 A1 | 5/2008 | Su et al. | |
| 2009/0059962 A1 | 3/2009 | Schmidt et al. | |
| 2011/0276714 A1* | 11/2011 | Yoshida | 709/233 |
| 2012/0124606 A1* | 5/2012 | Tidwell et al. | 725/17 |
| 2012/0257671 A1 | 10/2012 | Brockmann et al. | |
| 2012/0289147 A1* | 11/2012 | Raleigh et al. | 455/3.06 |
| 2013/0039177 A1 | 2/2013 | Ozawa | |
| 2013/0138800 A1* | 5/2013 | Gelter et al. | 709/224 |
| 2013/0216212 A1* | 8/2013 | Hurst | 386/353 |
| 2014/0280446 A1 | 9/2014 | Kasatani | |
| 2014/0280458 A1 | 9/2014 | Kasatani | |
| 2014/0280722 A1 | 9/2014 | Kasatani | |
| 2014/0280725 A1 | 9/2014 | Kasatani | |
| 2014/0280777 A1 | 9/2014 | Kasatani | |
| 2014/0282039 A1 | 9/2014 | Kasatani | |
| 2014/0282778 A1 | 9/2014 | Kasatani | |
| 2014/0282794 A1 | 9/2014 | Kasatani | |
| 2015/0009347 A1* | 1/2015 | O'Donnell et al. | 348/211.2 |

FOREIGN PATENT DOCUMENTS

| | | |
|---|---|---|
| JP | 5046527 | 7/2012 |
| WO | WO-2009/029339 A1 | 3/2009 |

OTHER PUBLICATIONS

U.S. Appl. No. 14/772,218, filed Sep. 2, 2015.
U.S. Appl. No. 14/772,150, filed Sep. 2, 2015.
U.S. Appl. No. 14/774,433, filed Sep. 10, 2015.
U.S. Appl. No. 14/773,138, filed Sep. 4, 2015.

* cited by examiner

FIG.12

DISTRIBUTION DESTINATION
SELECTION MENU

CHECK ANY CONTENT DISTRIBUTION
DESTINATION AND PRESS "OK"

| CHECK | SHARED ID | DISPLAY NAME |
|---|---|---|
|  | v003 | TOKYO HEAD OFFICE 10F MFP |
| ✓ | v006 | OSAKA EXHIBITION HALL 1F MULTIDISPLAY |
| ⋮ | ⋮ | ⋮ |

[ OK ]  [ CANCEL ]

FIG.13

| TERMINAL ID | USER CERTIFICATE | CONTRACT INFORMATION | TERMINAL TYPE | SETTING INFORMATION (HOME URL) | EXECUTION ENVIRONMENT INFORMATION (FAVORITES) (PREVIOUS COOKIE INFORMATION) (CACHE FILE) | SHARED ID | INSTALLATION POSITION | DISPLAY NAME |
|---|---|---|---|---|---|---|---|---|
| t001 | ...... | FHD, 30 FPS, 3-MONTH CONTRACT | NOTEBOOK PC | http://www.rocoh.co.jp | ...... | v001 | - | BEIJING OFFICE 10F RECEPTION TERMINAL |
| t002 | ...... | HD, 30 FPS, 3-MONTH CONTRACT | TABLET TERMINAL | http://www.rocoh.co.jp | ...... | v002 | - | NEW YORK OFFICE 1F LOBBY RECEPTION TERMINAL |
| t003 | ...... | QVGA, 15 FPS, 6 MONTHS | MFP | http://www.rocoh.co.jp | ...... | v003 | - | TOKYO HEAD OFFICE 10F MFP |
| t004 | ...... | WXGA, 15 FPS, 12 MONTHS | PROJECTOR | http://www.pontax.co.jp | - | v004 | - | TOKYO HEAD OFFICE 1F LOBBY PROJECTOR |
| t005 | ...... | WXGA, 15 FPS, 6 MONTHS | CAMERA/ MICROPHONE/ SPEAKER | - | - | v005 | - | NAGOYA BRANCH OFFICE 2F TV CONFERENCE ROOM TERMINAL |
| t006 | ...... | FHD, 30 FPS, 12-MONTH CONTRACT | MULTI-DISPLAY | - | - | v006 | LEFT | OSAKA EXHIBITION HALL 1F MULTI-DISPLAY |
| t007 | ...... | FHD, 30 FPS, 12-MONTH CONTRACT | MULTI-DISPLAY | - | - | v006 | MIDDLE | OSAKA EXHIBITION HALL 1F MULTI-DISPLAY |
| t008 | ...... | FHD, 30 FPS, 12-MONTH CONTRACT | MULTI-DISPLAY | - | - | v006 | RIGHT | OSAKA EXHIBITION HALL 1F MULTI-DISPLAY |
| ... | ... | ... | ... | ... | ... | ... | ... | ... |

FIG.14
| TERMINAL ID | SHARED ID |
|---|---|
| t001 | v003 |
| t001 | v006 |
| t002 | v001 |
| ⋮ | ⋮ |
FIG.15
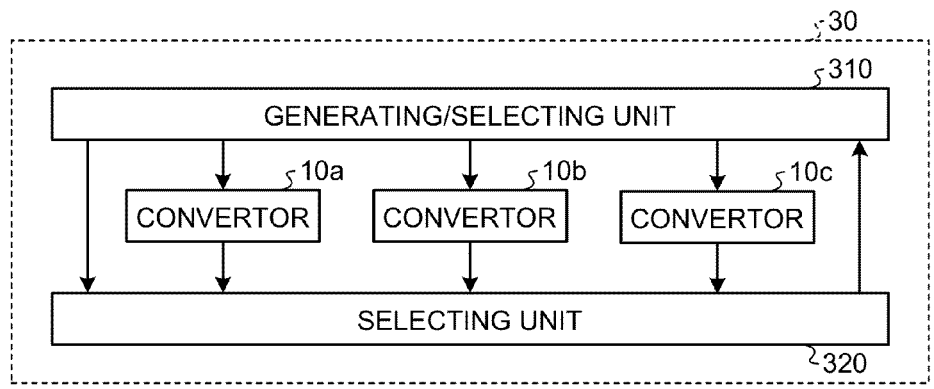
FIG.16
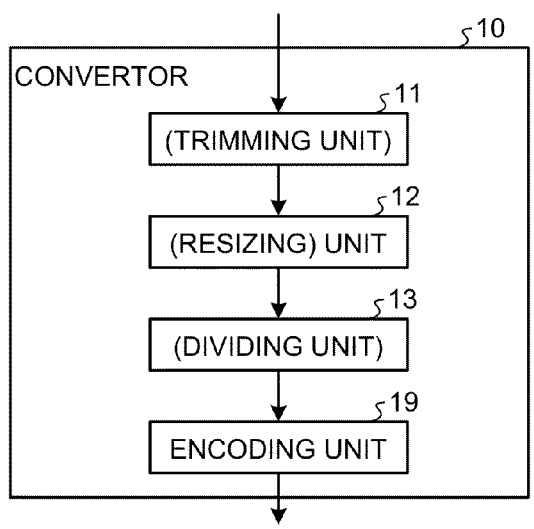

FIG.25

| No | VIDEO | SOUND |
|---|---|---|
| 1 | REPRODUCTION DELAY TIME | |
| 2 | TARGET BIT RATE | TARGET BIT RATE |
| 3 | FRAME RATE | SAMPLING RATE |
| 4 | RESOLUTION/COLOR DEPTH | QUANTIZED BIT COUNT |
| 5 | NUMBER OF CHANNELS (e.g., 2D to 3D) | NUMBER OF CHANNELS (e.g., 2ch to 1ch) |

FIG.26

| PARAMETER SET | CRITERIA WHEN INCREASING QUALITY OF PARAMETER SET | CRITERIA WHEN DECREASING QUALITY OF PARAMETER SET |
|---|---|---|
| A (HIGH QUALITY) | | |
| | ↑ 3.5 Mbps OR MORE CONTINUES FOR CERTAIN TIME PERIOD | ↓ LESS THAN 3.0 Mbps CONTINUES FOR CERTAIN TIME PERIOD |
| B | | |
| | ↑ 1.5 Mbps OR MORE CONTINUES FOR CERTAIN TIME PERIOD | ↓ LESS THAN 1.0 Mbps CONTINUES FOR CERTAIN TIME PERIOD |
| C | | |
| | ↑ 768 Kbps OR MORE CONTINUES FOR CERTAIN TIME PERIOD | ↓ LESS THAN 512 Kbps CONTINUES FOR CERTAIN TIME PERIOD |
| D (LOW QUALITY) | | |

DISTRIBUTION CONTROL, METHOD AND SYSTEM FOR CHANGING A PARAMETER OF REPRODUCTION QUALITY AT A COMMUNICATION TERMINAL BASED ON THE RECEIVED TRANSMISSION DELAY TIME INFORMATION

CROSS-REFERENCE TO RELATED APPLICATIONS

The present application claims priority to and incorporates by reference the entire contents of Japanese Patent Application No. 2013-054413 filed in Japan on Mar. 15, 2013; Japanese Patent Application No. 2013-206406 filed in Japan on Oct. 1, 2013; Japanese Patent Application No. 2014-004186 filed in Japan on Jan. 14, 2014; and Japanese Patent Application No. 2014-031507 filed in Japan on Feb. 21, 2014.

BACKGROUND OF THE INVENTION

1. Field of the Invention

The present invention relates to a distribution control system, a distribution control method, and a computer-readable storage medium.

2. Description of the Related Art

With the recent widespread use of the Internet, cloud computing has been used in various fields. The cloud computing is a service usage pattern in which users use services (cloud services) provided by a server on the Internet using a communication terminal connected to the Internet and pay therefor.

Web content carried on the Internet tends to be enriched for the purpose of responding to various demands. As a result, when using the enriched content using a communication terminal for using services through the Internet, there is a problem in that a load on the communication terminal is unfavorably high.

As a technology for reducing loads on communication terminals, there is a technology called thin client (see Japanese Patent Application Laid-open No. 2007-221229). Through this thin client technology, various applications can be performed on communication terminals in a web-based manner using an Internet environment.

However, even when using the thin client technology, when the enrichment of content progresses or a communication channel such as the Internet becomes congested, too much time is taken for the data of the above content or the like transmitted from a server to a communication terminal to reach the communication terminal, thereby causing a problem in that it is impossible to smoothly reproduce the data on the communication terminal.

SUMMARY OF THE INVENTION

It is an object of the present invention to at least partially solve the problems in the conventional technology.

According to an embodiment, there is provided a distribution control system for distributing data to a communication terminal through a communication network. The distribution control system includes a receiver configured to receive, from the communication terminal, transmission delay time information indicating transmission delay time from when the data is distributed by the distribution control system to when the data is received by the communication terminal; and a changing unit configured to change, based on the transmission delay time information received by the receiver, a parameter of reproduction quality when the data is reproduced by the communication terminal.

According to another embodiment, there is provided a distribution control method executed by a distribution control system for distributing data to a communication terminal through a communication network. The distribution control method includes receiving, from the communication terminal, transmission delay time information indicating transmission delay time from when the data is distributed by the distribution control system to when the data is received by the communication terminal; and changing, based on the transmission delay time information received at the receiving, a parameter of reproduction quality when the data is reproduced by the communication terminal.

According to still another embodiment, there is provided a non-transitory computer-readable storage medium with an executable program stored thereon and executed by a computer, wherein the program instructs the computer to perform the distribution control method according to the above embodiment.

According to still another embodiment, there is provided a distribution control system for distributing data to a communication terminal through a communication network. The distribution control system includes a receiver configured to receive, from the communication terminal, time from when the data is distributed by the distribution control system to when the data is received by the communication terminal; and a changing unit configured to change, based on the time received by the receiver and a size of the data, operation of a convertor configured to convert the data into data to be distributed.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 12 is a conceptual view of a distribution destination selection menu screen;

FIG. 13 is a conceptual view of a terminal management table;

FIG. 14 is a conceptual view of an available terminal management table;

FIG. 15 is a detailed diagram of an encoder bridge unit;

FIG. 16 is a functional block diagram illustrating the functions of a convertor;

FIG. 25 is a view illustrating an example of parameters included in a parameter set;

FIG. 26 is a view for illustrating an example of criteria when changing the quality of parameter sets.

DETAILED DESCRIPTION OF THE PREFERRED EMBODIMENTS

Described below with reference to the accompanying drawings is a distribution system 1 according to an embodiment. Described below in detail is an invention that causes both a web browser (hereinafter represented as a "browser") and an encoder to execute in cooperation with each other on a cloud using cloud computing and transmits video data, sound data, and the like to communication terminals.

"Images" represented below include a still image and a moving image. "Videos" represented below basically mean moving images and also include moving images that are stopped to be still images. A case indicating at least either one of a still image and a sound is represented as a "still image (sound)." A case indicating at least either one of an image and a sound is represented as an "image (sound)." A case indicating at least either one of video and a sound is represented as a "video (sound)."

Outline of Embodiment

Figure 1:
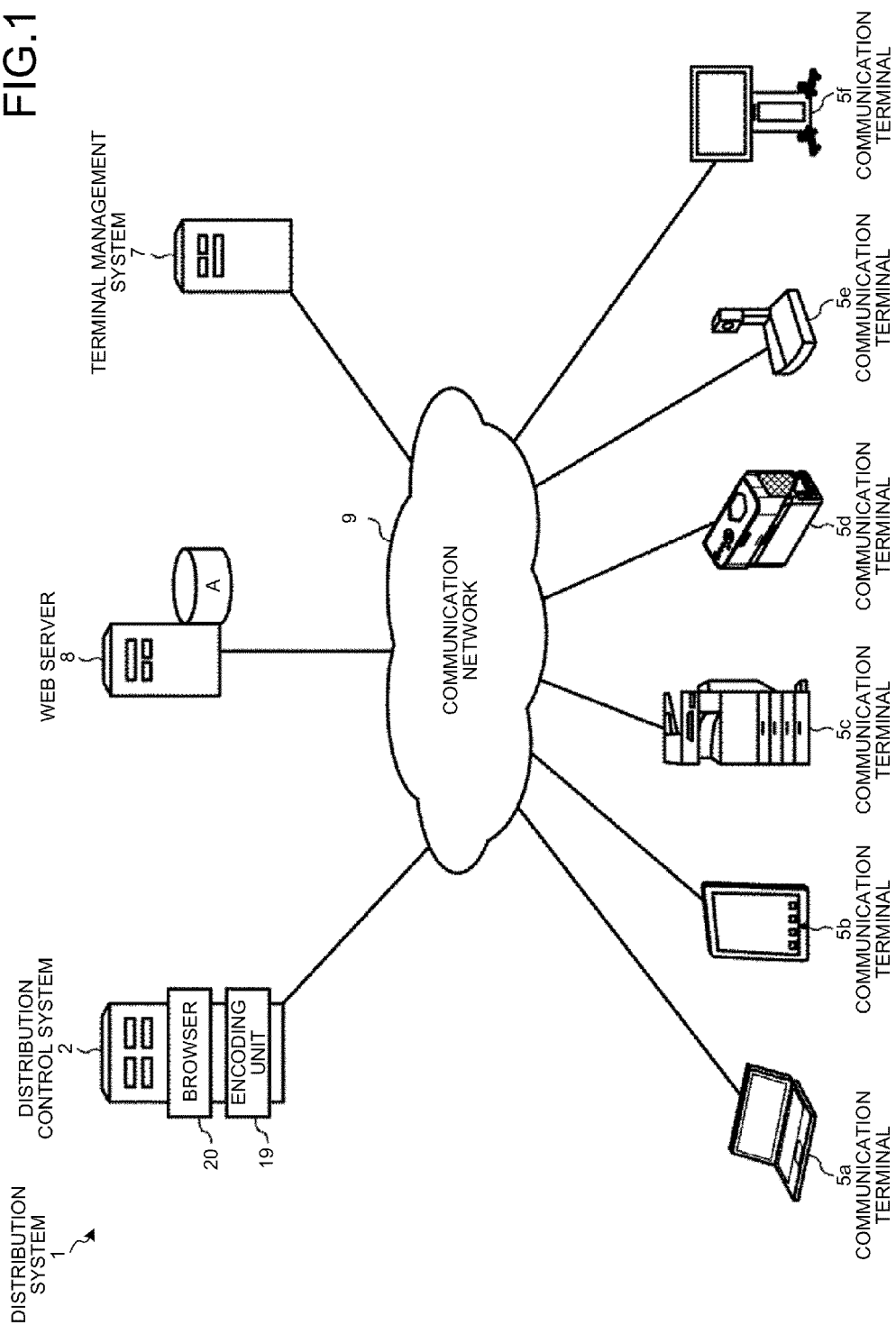
FIG. 1 is a schematic diagram of a distribution system according to an embodiment.

Described with reference to FIG. 1 is an outline of an embodiment according to the present invention. FIG. 1 is a schematic diagram of a distribution system according to the present embodiment.

Outline of System Configuration

Described first is an outline of the configuration of the distribution system 1.

As illustrated in FIG. 1, the distribution system 1 according to the present embodiment is constructed by a distribution control system 2, a plurality of communication terminals (5a to 5f), a terminal management system 7, and a web server 8. In the following, any communication terminal among the communication terminals (5a to 5f) is represented as a "communication terminal 5". The distribution control system 2, the terminal management system 7, and the web server 8 are all constructed by server computers.

The communication terminal 5 is a terminal used by a user who receives services of the distribution system 1. The communication terminal 5a is a notebook personal computer (PC). The communication terminal 5b is a mobile terminal such as a smartphone and a tablet terminal. The communication terminal 5c is a multifunction peripheral/printer/product (MFF) in which the functions of copying, scanning, printing, and faxing are combined. The communication terminal 5d is a projector. The communication terminal 5e is a TV (video) conference terminal having a camera, a microphone, and a speaker. The communication terminal 5f is an electronic blackboard (whiteboard) capable of electronically converting drawings drawn by a user or the like.

The communication terminal 5 is not only such terminals as illustrated in FIG. 1, but also may be devices communicable through a communication network such as the Internet, including a watch, a vending machine, a car navigation device, a game machine, an air conditioner, a lighting fixture, a camera alone, a microphone alone, and a speaker alone.

The distribution control system 2, the communication terminal 5, the terminal management system 7, and the web server 8 can communicate with each other through a communication network 9 such as the Internet and a local area network (LAN). The communication network 9 includes wireless communication networks such as 3rd Generation (3G), Worldwide Interoperability for Microwave Access (WiMAX), and Long-Term Evolution (LTE).

Figure 2:
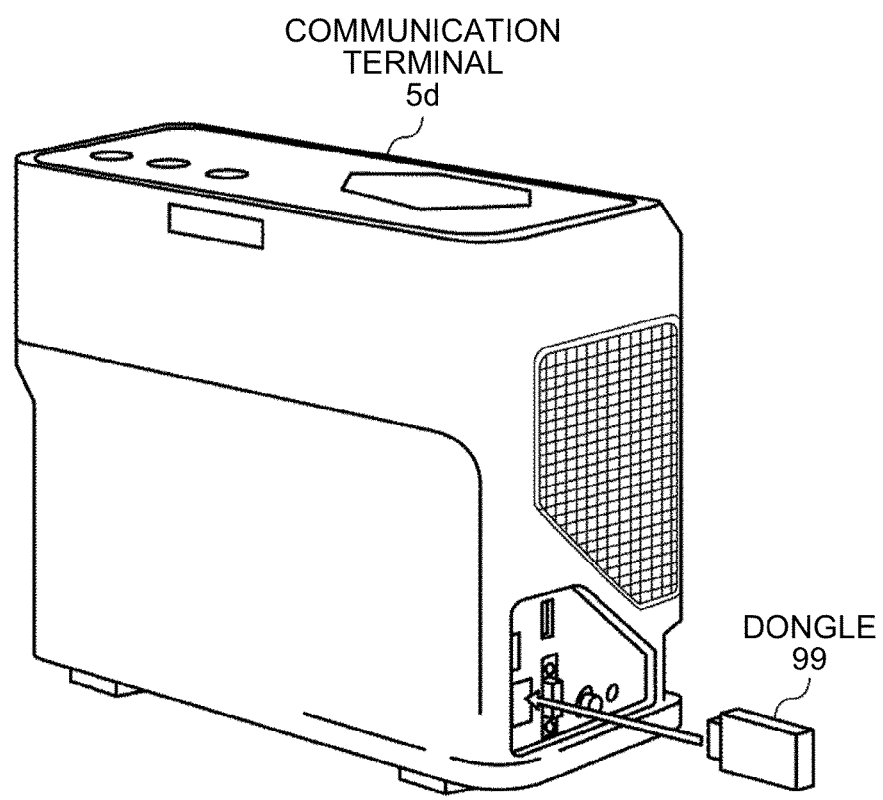
FIG. 2 is a conceptual view when a dongle is attached to a communication terminal.

The communication terminal 5, like the communication terminal 5d, may not have a function of communicating with the other terminals and systems through the communication network 9. However, as illustrated in FIG. 2, a user inserts a dongle 99 into an interface of Universal Serial Bus (USB) or High-Definition Multimedia Interface (HDMI) of the communication terminal 5d, thereby allowing it to communicate with the other terminals and systems. FIG. 2 is a conceptual view when the dongle is attached to the communication terminal.

The distribution control system 2 has a browser 20 on a cloud, and the function of rendering in the browser 20 acquires single or a plurality of pieces of content data described in a certain description language and performs rendering thereon, thereby generating frame data as still image data such as bitmap data made up of red, green, and blue (RGB) or sound data such as pulse code modulation (PCM) data (i.e., still image (sound) data). The content data is data acquired from the web server 8, any communication terminal, and the like and includes image (sound) data in Hypertext Markup Language (HTML) and Cascading Style Sheets (CSS), image (sound) data in MP4 (MPEG-4), sound data in Advanced Audio Coding (AAC), and the like.

The distribution control system 2 has an encoding unit 19 on the cloud, and the encoding unit 19 plays a role as an encoder, thereby converting pieces of frame data as pieces of still image (sound) data into video (sound) data of the compression coding system such as H.264 (MPEG-4 AVC), H.265, and Motion JPEG.

The terminal management system 7 performs login authentication on the communication terminal 5 and manages the contract information and the like of the communication terminal 5. The terminal management system 7 has a function of a Simple Mail Transfer Protocol (SMTP) server for transmitting e-mails. The terminal management system 7 can be embodied as, for example, an imaginary machine developed on a cloud service (IaaS: Infrastructure as a Service). It is desirable that the terminal management system 7 be operated in a multiplexed manner in order to address unexpected incidents to perform continuous service provision.

The browser 20 enables real-time communication/collaboration (RTC). The distribution control system 2 has the encoding unit 19 in FIG. 16 described below, and the encoding unit 19 can perform real-time encoding on the frame data output by the browser 20 and output video (sound) data generated through conversion based on the H.264 standards or the like. As a result, the processing of the distribution control system 2 is different from, for example, a case in which non real-time video (sound) data recorded in a DVD is read and distributed by a DVD player.

Not only the distribution control system 2, but also the communication terminal 5 may have a browser. In this case, updating the browser 20 of the distribution control system 2 eliminates the need to start up the browsers of the respective communication terminals 5.

Outline of Various Kinds of Distribution Methods

Described next is an outline of various kinds of distribution methods.

Basic Distribution

Figure 3:
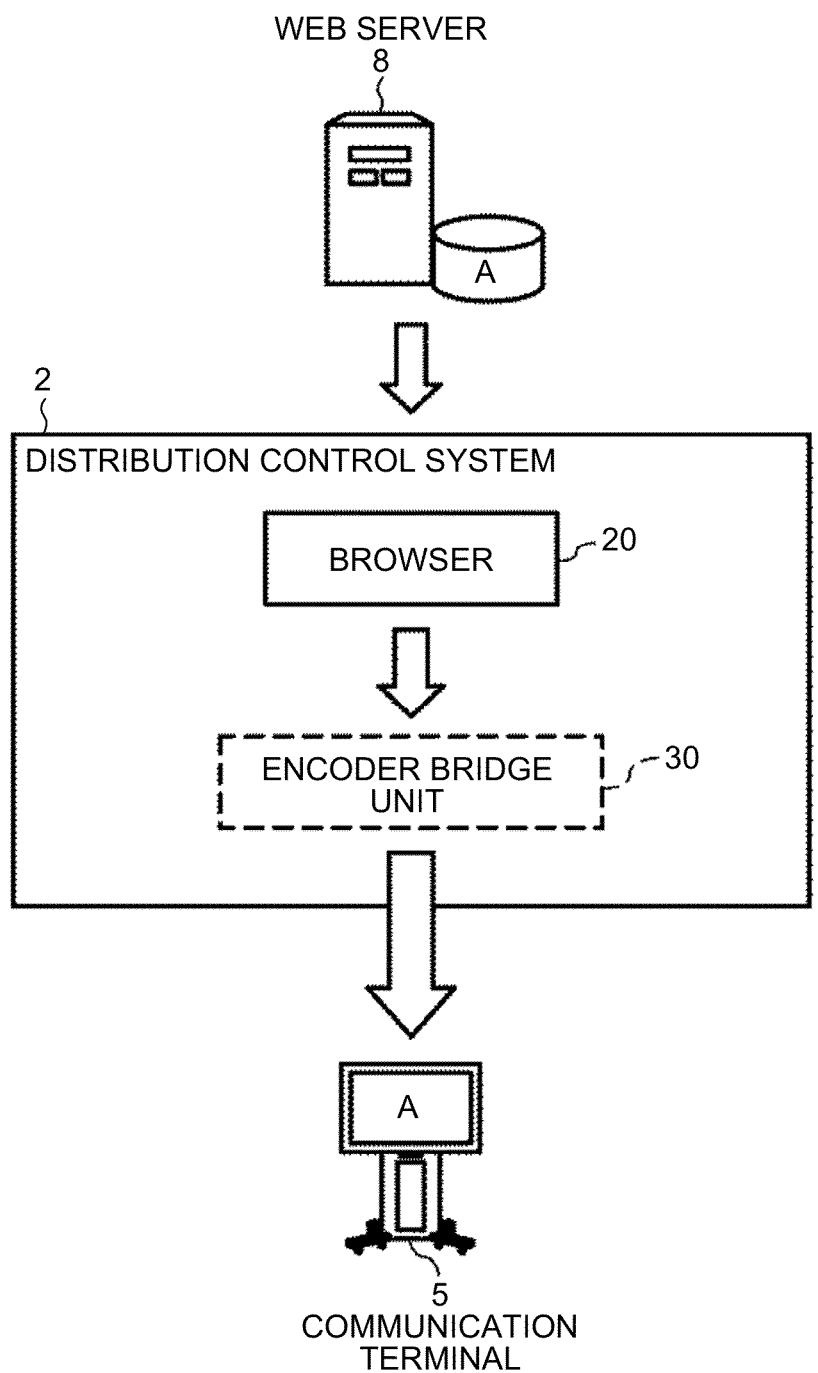
FIG. 3 is a conceptual diagram illustrating a basic distribution method.

FIG. 3 is a conceptual diagram illustrating a basic distribution method. In the distribution system 1, as illustrated in FIG. 3, the browser 20 of the distribution control system 2 acquires web content data [A] as image (sound) data from the web server 8 and renders it, thereby generating pieces of frame data [A] as pieces of still image (sound) data. An encoder bridge unit 30 including the encoding unit 19 performs encoding and the like on the pieces of frame data [A], thereby converting it into video (sound) data of the compression coding system such as H.264. The distribution control system 2 distributes the video (sound) data [A] after being converted (an example of transmission data) to the communication terminal 5.

Thus, the distribution control system 2 can distribute even rich web content data to the communication terminal 5 while converting it from the web content data in HTML or the like into the compressed video (sound) data in H.264 or the like on the cloud. As a result, the web content can be smoothly reproduced on the communication terminal 5 side without time and effort and costs for improving the specification of a central processing unit (CPU), an operating system (OS), and the like.

Even when the enrichment of web content progresses in the future, because only the specifications of the browser 20, the CPU, and the like in the distribution control system 2 on the cloud have to be improved, the specification of the communication terminal 5 does not need to be improved.

Figure 4:
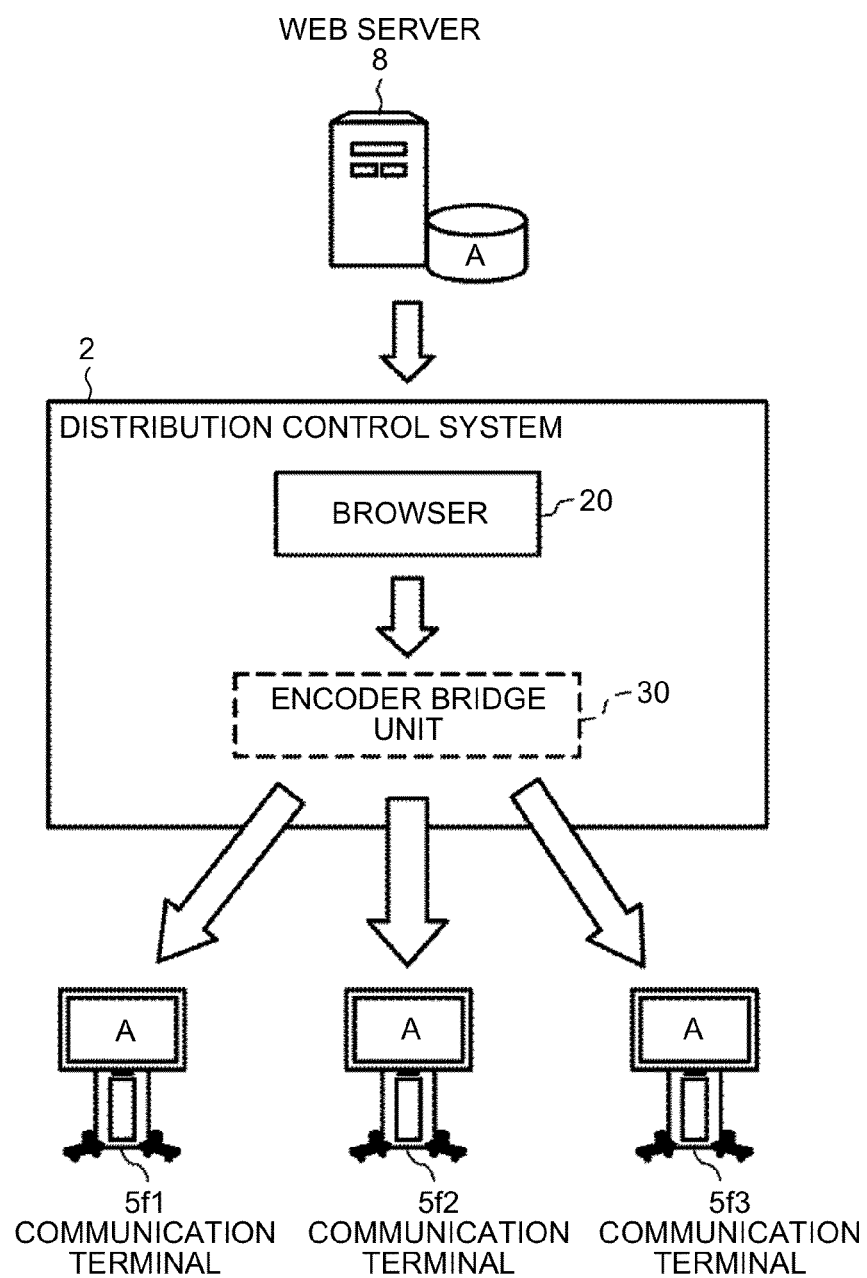
FIG. 4 is a conceptual diagram of multicast.
Figure 5:
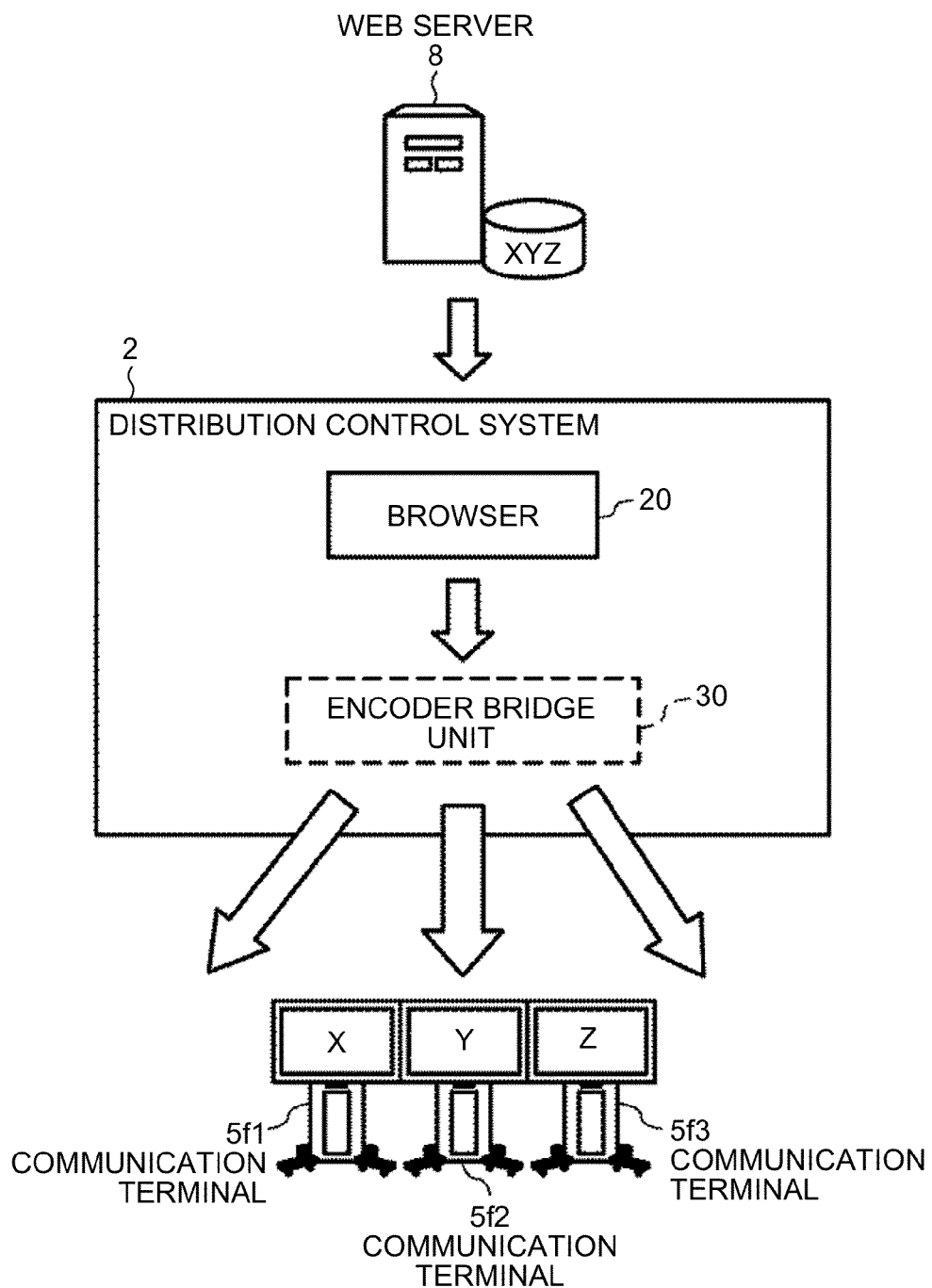
FIG. 5 is a conceptual diagram of multidisplay.
Figure 6:
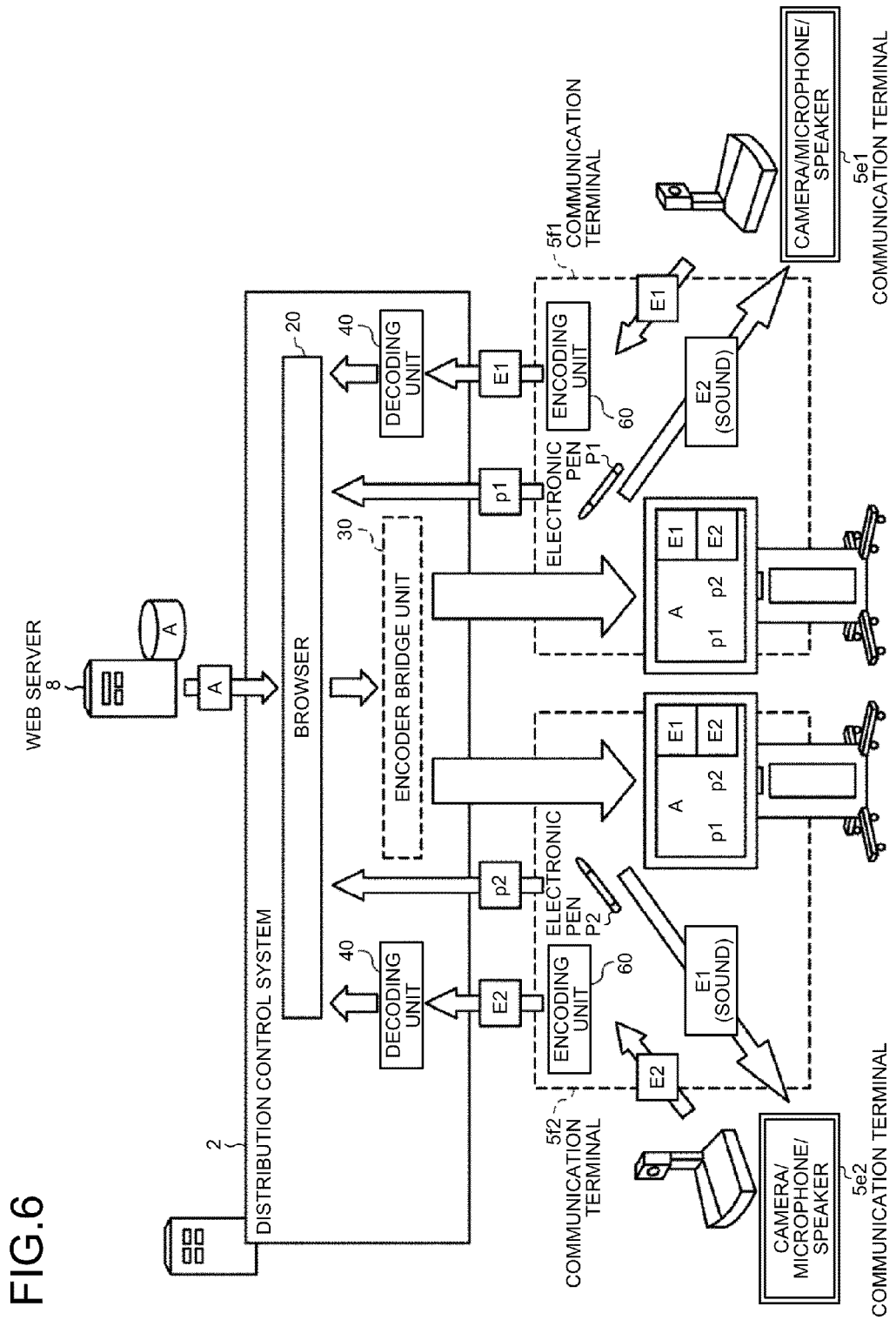
FIG. 6 is a conceptual diagram of composite distribution using a plurality of communication terminals through a distribution control system.

Applying the above distribution method, as illustrated in FIG. 4 to FIG. 6, the distribution system 1 also can distribute web content data to a plurality of sites as video (sound) data. Described here are distribution methods illustrated in FIG. 4 to FIG. 6.

Multicast

FIG. 4 is a conceptual diagram of multicast. As illustrated in FIG. 4, the single browser 20 of the distribution control system 2 acquires the web content data [A] as image (sound) data from the web server 8 and renders it, thereby generating pieces of frame data [A] as pieces of still image (sound) data. The encoder bridge unit 30 encodes the pieces of frame data [A], thereby converting them into video (sound) data. The distribution control system 2 then distributes the video (sound) data [A] to a plurality of communication terminals (5/1, 5/2, 5/3).

Thus, the same video (sound) is reproduced at the sites. In this case, the communication terminals (5/1, 5/2, 5/3) do not need to have the same display reproduction capability (e.g., the same resolution). The distribution method like this is called, for example, "multicast".

Multidisplay

FIG. 5 is a conceptual diagram of multidisplay. As illustrated in FIG. 5, the single browser 20 of the distribution control system 2 acquires web content data [XYZ] as image (sound) data from the web server 8 and renders it, thereby generating pieces of frame data [XYZ] as pieces of still image (sound) data. For each frame data [XYZ], the encoder bridge unit 30 divides it into a plurality of pieces of frame data ([X], [Y], [Z]) and then encodes them, thereby converting into a plurality of pieces of video (sound) data ([X], [Y], [Z]). The distribution control system 2 then distributes the video (sound) data [X] to the communication terminal 5/1. Similarly, the distribution control system 2 distributes the video (sound) data [Y] to the communication terminal 5/2 and distributes the video (sound) data [Z] to the communication terminal 5/3.

Thus, for example, even for landscape web content [XYZ], video (sound) is reproduced by the communication terminals 5 in a divided manner. As a result, when the communication terminals (5/1, 5/2, 5/3) are installed in a line, the same effect as the reproduction of one piece of large video can be obtained. In this case, the communication terminals (5/1, 5/2, 5/3) need to have the same display reproduction capability (e.g., the same resolution). The distribution method like this is called, for example, "multidisplay".

Composite Distribution

FIG. 6 is a conceptual diagram of composite distribution using a plurality of communication terminals through a distribution control system. As illustrated in FIG. 6, at a first site (the right side in FIG. 6), the communication terminal 5/1 as an electronic blackboard and a communication terminal 5e1 as a TV conference terminal are used, and at a second site (the left side in FIG. 6), the communication terminal 5/2 as an electronic blackboard and a communication terminal 5e2 as a TV conference terminal are used similarly. At the first site, an electronic pen P1 is used for drawing characters and the like with strokes on the communication terminal 5/1. At the second site, an electronic pen P2 is used for drawing characters and the like with strokes on the communication terminal 5/2.

At the first site, video (sound) data acquired by the communication terminal 5e1 is encoded by an encoding unit 60 and is then transmitted to the distribution control system 2. After that, it is decoded by a decoding unit 40 of the distribution control system 2 and is then input to the browser 20. Operation data indicating the strokes drawn by the communication terminal 5/1 with the electronic pen P1 (in this case, coordinate data on the display of the communication terminal 5/1 or the like) is transmitted to the distribution control system 2 to be input to the browser 20. Also at the second site, video (sound) data acquired by the communication terminal 5e2 is encoded by the encoding unit 60 and is then transmitted to the distribution control system 2. After that, it is decoded by the decoding unit 40 of the distribution control system 2 and is then input to the browser 20. Operation data indicating the strokes drawn by the communication terminal 5/2 with the electronic pen P2 (in this case, coordinate data on the display of the communication terminal 5/2 or the like) is transmitted to the distribution control system 2 to be input to the browser 20.

The browser 20 acquires, for example, web content data [A] as a background image displayed on the respective displays of the communication terminals (5/1, 5/2) from the web server 8. The browser 20 combines the web content data [A], operation data ([p1], [p2]), and video (sound) content data ([E1], [E2]) and renders them, thereby generating pieces of frame data as pieces of still image (sound) data in which the respective pieces of content data ([A], [p1], [p2], [E1], [E2])

are arranged with a desired layout. The encoder bridge unit 30 encodes the pieces of frame data, and the distribution control system 2 distributes video (sound) data indicating the same content ([A], [p1], [p2], [E1], [E2]) to both sites. At the first site, thereby, video ([A], [p1], [p2], [E1 (video part)] and [E2] (video part) are displayed on the display of the communication terminal 5/1, and a sound [E2 (sound part)] is output from the speaker of the communication terminal 5e1. Also at the second site, video ([A], [p1], [p2], [E1 (video part)] and [E2] (video part) are displayed on the display of the communication terminal 5/2, and a sound [E1 (sound part)] is output from the speaker of the communication terminal 5e2. At the first site, the sound of the site itself [E1 (sound part)] is not output owing to an echo cancelling function of the communication terminal 5/1. At the second site, the sound of the site itself [E2 (sound part)] is not output owing to an echo cancelling function of the communication terminal 5/2.

Thus, at the first site and the second site, remote shared processing can be performed that shares the same information in real time at remote sites, thus making the distribution system 1 according to the present embodiment effective in a teleconference or the like.

DETAILED DESCRIPTION OF THE EMBODIMENT

Described next with reference to FIG. 7 to FIG. 24 is detailed description of the embodiment.

Hardware Configuration of the Embodiment

Figure 7:
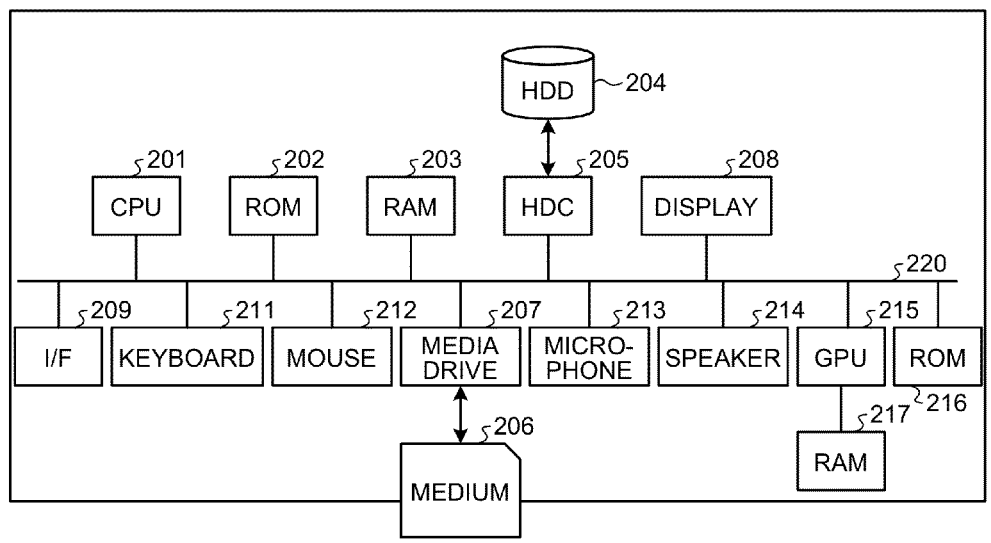
FIG. 7 is a hardware configuration diagram of a distribution control system, a communication terminal, a terminal management system, and a web server.
Figure 8:
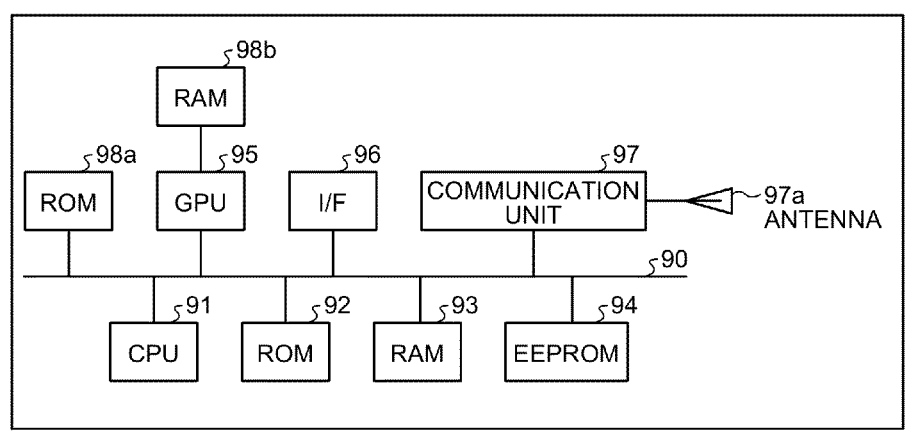
FIG. 8 is a hardware configuration diagram of the dongle.

Described first with reference to FIG. 7 and FIG. 8 is the hardware configuration of the present embodiment. FIG. 7 is a hardware configuration diagram of a distribution control system, a communication terminal, a terminal management system, and a web server. FIG. 8 is a hardware configuration diagram of a dangle. Because a hardware configuration relating to the communication of the communication terminal is the same as part of the hardware configuration of the communication terminal, the description thereof will be omitted.

As illustrated in FIG. 7, the distribution control system 2 includes: a (host) CPU 201 that controls the entire operation of the distribution control system 2; a ROM 202 that stores therein a program used for driving the CPU 201 such as IPL; a RAM 203 used as a work area of the CPU 201; an HDD 204 that stores therein various kinds of data such as programs; a hard disk controller (HDC) 205 that controls the reading and writing the various kinds of data from and into the HDD 204 under the control of the CPU 201; a media drive 207 that controls the reading and writing data from and into a storage medium 206 such as a flash memory; a display 208 that displays various kinds of information; an I/F 209 for transmitting data using the communication network 9 and connecting the dongle 99; a keyboard 211; a mouse 212; a microphone 213, a speaker 214, a graphics processing unit (GPU) 215; a ROM 216 that stores therein a program used for driving the GPU 215; a RAM 217 used as a work area of the GPU 215; and a bus line 220 such as an address bus and a data bus for electrically connecting the above components as illustrated in FIG. 7. As in the communication terminal 5d as a projector, the GPU may not be provided. Because the hardware configuration of the terminal management system 7 and the web server 8 is the same as the hardware configuration of the distribution control system 2, the description thereof will be omitted.

Described next with reference to FIG. 8 is the hardware configuration of the dongle illustrated in FIG. 2. As illustrated in FIG. 8, the dongle 99 includes: a CPU 91 that controls the entire operation of the dongle 99; a ROM 92 that stores therein a basic input/output program; a RAM 93 used as a work area of the CPU 91; an electrically erasable and programmable ROM (EEPROM) 94 that performs the reading and writing of data under the control of the CPU 91; a GPU 95; a ROM 98a that stores therein a program used for driving the GPU 95; a RAM 98b used as a work area of the GPU 95; an interface I/F 96 for being connected to the interface I/F 209 of the communication terminal 5; an antenna 97a; a communication unit 97 that performs communications by a short-distance wireless technology using the antenna 97a; and a bus line 90 such as an address bus and a data bus for electrically connecting the above units. Examples of the short-distance wireless technology include the near field communication (NFC) standards, Bluetooth (registered trademark), wireless fidelity (WiFi), and ZigBee. Because the dangle 99 includes the GPU 95, even for such a case including no GPU as the communication terminal 5d, the communication terminal 5 can perform calculation processing needed for graphics display by attaching the dangle 99 as illustrated in FIG. 2.

Functional Configuration of the Embodiment

Described next with reference to FIG. 9 to FIG. 16 is the functional configuration of the embodiment.

Functional Configuration of the Distribution Control System

Figure 9:
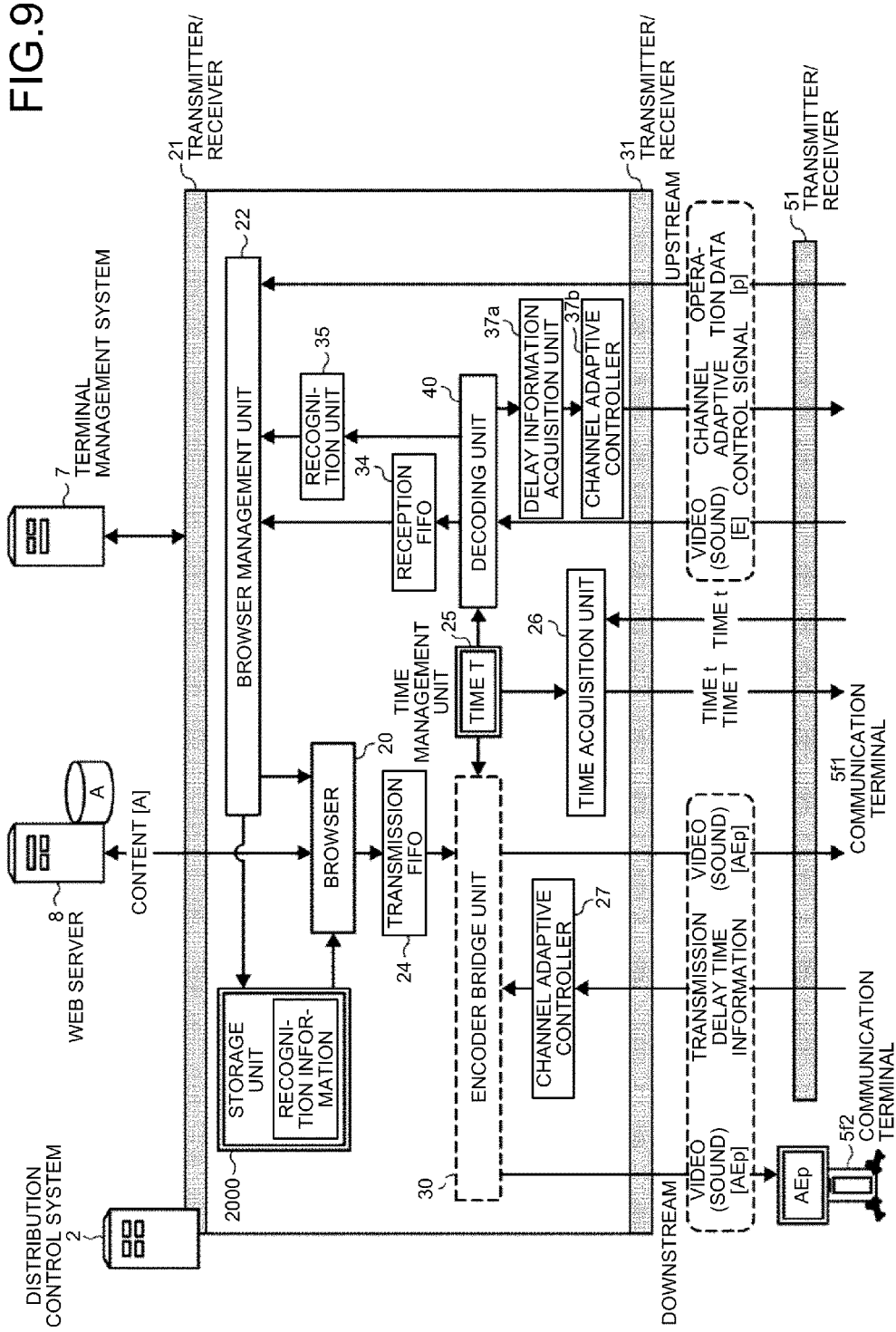
FIG. 9 is a functional block diagram illustrating mainly the functions of the distribution control system.

Described first with reference to FIG. 9 is the functional configuration of the distribution control system 2. FIG. 9 is a functional block diagram illustrating mainly the functions of the distribution control system. FIG. 9 illustrates a functional configuration when the distribution control system 2 distributes video (sound) data to the communication terminal 5/1, and the distribution control system 2 has the same functional configuration also when the distribution destination is other than the communication terminal 5/1. Although the distribution control system 2 includes a plurality of distribution engine servers, described below is a case when a single distribution engine server is included in order to simplify the description.

As illustrated in FIG. 9, the distribution control system 2 has functional components illustrated in FIG. 9 by the hardware configuration including a processor such as the CPU 201 or the GPU 215 and the programs illustrated in FIG. 7.

Specifically, the distribution control system 2 includes the browser 20, a transmitter/receiver 21, a browser management unit 22, a transmission first-in first-out (FIFO) buffer 24, a time management unit 25, a time acquisition unit 26, a channel adaptive controller 27, the encoder bridge unit 30, a transmitter/receiver 31, a reception FIFO 34, a recognition unit 35, a delay information acquisition unit 37a, a channel adaptive controller 37b, and the decoding unit 40. The distribution control system 2 further includes a storage unit 2000 constructed by the HDD 204 illustrated in FIG. 7. This storage unit 2000 stores therein recognition information described below output from the recognition unit 35 and sent through the browser management unit 22. The content data acquired by the browser 20 can be temporarily stored in the storage unit 2000 as a cache.

Among the above functional components, the browser 20 is a browser that operates within the distribution control system 2. The browser 20 is updated corresponding to the enrichment of web content at all times. The browser 20 has, for example, Media Player, Flash Player, JavaScript (registered trademark), CSS, and HTML Renderer. JavaScript includes the standardized product and one unique to the distribution system 1.

Media Player is a browser plug-in for reproducing multimedia files such as video (sound) files within the browser 20. Flash Player is a browser plug-in for reproducing flash content within the browser 20. The unique JavaScript is a JavaScript group that provides the application programming interface (API) of services unique to the distribution system 1. CSS is a technology for efficiently defining the appearance and style of web pages described in HTML. HTML Renderer is an HTML rendering engine.

A renderer renders content data such as web content data as image (sound) data, thereby generating pieces of frame data as pieces of still image (sound) data. As illustrated in FIG. 6, the renderer is also a layout engine that performs the layout of a plurality of kinds of content ([A], [p1], [p2], [E1], [E2]).

The distribution system 1 according to the present embodiment provides the browsers 20 within the distribution control system 2, and a cloud browser for use in a user session is selected from the browsers 20. Described below continuously is a case of providing the single browser 20 in order to simplify the description.

The transmitter/receiver 21 transmits and receives various kinds of data, various kinds of requests, various kinds of instructions, and the like to and from the terminal management system 7 and the web server 8. For example, the transmitter/receiver 21 acquires web content data from a content site of the web server 8. The transmitter/receiver 21 outputs the various kinds of data acquired from the terminal management system 7 to the functional components within the distribution control system 2 and controls the functional components within the distribution control system 2 based on the various kinds of data, various kinds of requests, various kinds of instructions, and the like acquired from the terminal management system 7. For example, for the browsers 20 provided in plurality, the transmitter/receiver 21 outputs a request for switching distribution patterns from the terminal management system 7 to the browser management unit 22, and the browser management unit 22 controls switching from one browser to another browser among the browsers 20. Based on the request for switching distribution from the terminal management system 7, the transmitter/receiver 21 performs the switching of combinations of the components within the encoder bridge unit 30 illustrated in FIG. 15 and FIG. 16.

The browser management unit 22 manages the browser 20. For example, the browser management unit 22 instructs the browser 20 to start up and exit and numbers an encoder ID at startup or exit. The encoder ID is identification information the browser management unit 22 numbers in order to manage the process of the encoder bridge unit 30. The browser management unit 22 numbers and manages a browser ID every time the browser 20 is started up. The browser ID is identification information the browser management unit 22 numbers in order to manage the process of the browser 20 to identify the browser 20.

The browser management unit 22 acquires various kinds of operation data from the communication terminal 5 through the transmitter/receiver 31 and outputs them to the browser 20. The operation data is data occurring through operation events (operations through the keyboard 211, the mouse 212, and the like, strokes with the electronic pen 2, and the like) on the communication terminal 5. When the communication terminal 5 provides various sensors such as a temperature sensor, a humidity sensor, or an acceleration sensor, the browser management unit 22 acquires sensor information that is an output signal of the sensors from the communication terminal 5 and outputs it to the browser 20. The browser management unit 22 further acquires image (sound) data from the recognition unit 35 and outputs it to the browser 20 and acquires recognition information described below from the recognition unit 35 and stores it in the storage unit 2000.

The browser management unit 22 acquires video (sound) data from the reception FIFO 34 and outputs it to the browser 20.

The transmission FIFO 24 is a buffer that stores therein the pieces of frame data as pieces of still image (sound) data generated by the browser 20.

The time management unit 25 manages time T unique to the distribution control system 2.

The time acquisition unit 26 performs time adjustment processing in conjunction with a time controller 56 in the communication terminal 5 described below. Specifically, the time acquisition unit 26 acquires time information (T) indicating time T in the distribution control system 2 from the time management unit 25, receives time information (t) indicating time t in the communication terminal 5 from the time controller 56 described below through the transmitter/receiver 31 and a transmitter/receiver 51, and transmits the time information (t) and the time information (T) to the time controller 56.

The channel adaptive controller 27, which may be referred to as a changing unit, calculates reproduction delay time U based on transmission delay time information (D) and calculates operation conditions such as the frame rate and the data resolution of a convertor 10 in the encoder bridge unit 30. This reproduction delay time U is time for delaying reproduction through the buffering of data until being reproduced. In other words, the channel adaptive controller 27 changes the operation of the encoder bridge unit 30 based on the transmission delay time information (D) and the size of the data (e.g., the number of bits or the number of bytes). As described later, the transmission delay time information (D) indicates frequency distribution information based on a plurality of pieces of transmission delay time D1 acquired from a reproduction controller 53 by a delay information acquisition unit 57 of the communication terminal 5. The transmission delay time D1 indicates time from the point when the video (sound) data is transmitted from the distribution control system 2 to the point when it is received by the communication terminal 5.

The encoder bridge unit 30 outputs the pieces of frame data as pieces of still image (sound) data generated by the browser 20 to the convertor 10 in the encoder bridge unit 30 described below. In this case, the convertor 10 also operates based on the operation conditions calculated by the channel adaptive controller 27. The encoder bridge unit 30 will be described in more detail with reference to FIG. 15 and FIG. 16. FIG. 15 is a detailed diagram of the encoder bridge unit. FIG. 16 is a functional block diagram illustrating the functions of the convertor.

As illustrated in FIG. 15, the encoder bridge unit 30 is constructed by a generating/selecting unit 310, a selecting unit 320, and a plurality of converters (10a, 10b, 10c) provided therebetween. Although the three converters are illustrated here, any number of them may be provided. In the following, any convertor is represented as a "convertor 10".

The convertor 10 converts the data format of the pieces of frame data as pieces of still image (sound) data generated by the browser 20 into a data format of H.264 or the like capable of being distributed to the communication terminal 5 through the communication network 9. For that purpose, as illustrated in FIG. 16, the convertor 10 includes a trimming unit 11, a resizing unit 12, a dividing unit 13, and the encoding unit 19. The trimming unit 11, the resizing unit 12, and the dividing unit 13 do not perform any processing on sound data.

The trimming unit 11 performs processing to cut out only part of a still image. The resizing unit 12 changes the reduced scale of a still image. The dividing unit 13 divides a still image as illustrated in FIG. 5.

The encoding unit 19 encodes the pieces of frame data as pieces of still image (sound) data generated by the browser 20, thereby converting them so that video (sound) data can be distributed to the communication terminal 5 through the communication network 9. When the video is not in motion (when there is no inter-frame update (change)), a skip frame (may be sometimes referred to as frame skip) is thereafter inserted until the video moves to save a band.

When sound data is generated together with still image data by rendering, theses both pieces of data are encoded, and when only sound data is generated, only encoding is performed, without performing trimming, resizing, and dividing, causing data to be compressed.

The generating/selecting unit 310 generates a new convertor 10 and selects pieces of frame data as pieces of still image (sound) data to be input to a convertor 10 that is already generated. In generating it, the generating/selecting unit 310 generates a convertor 10 allowing conversion according to the reproduction capability of video (sound) data in the communication terminal 5. In selecting it, a convertor 10 that is already generated is selected. For example, in starting distribution to the communication terminal 5b in addition to distribution to the communication terminal 5a, the same video (sound) data as video (sound) data being distributed to the communication terminal 5a may be distributed to the communication terminal 5b. In such a case, furthermore, when the communication terminal 5b has the same reproduction capability as the reproduction capability of video (sound) data of the communication terminal 5a, the generating/selecting unit 310, without generating a new convertor 10b for the communication terminal 5b, utilizes the convertor 10a that is already generated for the communication terminal 5a.

The selecting unit 320 selects a desired one from the convertors 10 that are already generated. The selection by the generating/selecting unit 310 and the selecting unit 320 can perform distribution of various patterns as illustrated in FIG. 6.

The transmitter/receiver 31 transmits and receives various data, requests, and the like to and from the communication terminal 5. This transmitter/receiver 31 transmits various data, requests, and the like to the communication terminal 5 through the communication network 9 from the cloud, thereby allowing the distribution control system 2 to distribute various data, requests, and the like to the communication terminal 5. For example, in the login processing of the communication terminal 5, the transmitter/receiver 31 transmits, to the transmitter/receiver 51 of the communication terminal 5, authentication screen data for prompting a user a login request. The transmitter/receiver 31 also performs data transmission and data reception to and from user applications of the communication terminal 5 and device applications of the communication terminal 5 by a protocol unique to the distribution system 1 through a Hypertext Transfer Protocol over Secure Socket Layer (HTTPS) server. This unique protocol is an HTTPS-based application layer protocol for transmitting and receiving data in real time and without being interrupted between the distribution control system 2 and the communication terminal. The transmitter/receiver 31 also performs transmission response control, real-time data generation, command transmission, reception response control, reception data analysis, and gesture conversion.

Among these, the transmission response control is processing to manage an HTTPS session for downloading requested from the communication terminal 5 in order to transmit data from the distribution control system 2 to the communication terminal 5. The response of the HTTPS session for downloading does not end immediately and holds for a certain period of time (one to a few minutes). The transmitter/receiver 31 dynamically writes data to be sent to the communication terminal 5 in the Body part of the response. In order to eliminate costs for reconnection, another request is allowed to reach from the communication terminal before the previous session ends. By putting the transmitter/receiver 31 on standby until the previous request is completed, overhead can be eliminated even when reconnection is performed.

The real-time data generation is processing to give a unique header to the data of compressed video (and a compressed sound) generated by the encoding unit 19 in FIG. 16 and write it in the Body part of HTTPS.

The command transmission is processing to generate command data to be transmitted to the communication terminal 5 and write it in the Body part of HTTPS directed to the communication terminal 5.

The reception response control is processing to manage an HTTPS session requested from the communication terminal 5 in order for the distribution control system 2 to receive data from the communication terminal 5. The response of this HTTPS session does not end immediately and is held for a certain period of time (one to a few minutes). The communication terminal 5 dynamically writes data to be sent to the transmitter/receiver 31 of the distribution control system 2 in the Body part of the request.

The reception data analysis is processing to analyze the data transmitted from the communication terminal 5 by type and deliver the data to a necessary process.

The gesture conversion is processing to convert a gesture event input to the communication terminal 5f as the electronic blackboard by a user with an electronic pen or in handwriting into data of a format capable of being received by the browser 20.

The reception FIFO 34 is a buffer that stores therein video (sound) data after being decoded by the decoding unit 40.

The recognition unit 35 performs processing on image (sound) data received from the communication terminal 5. Specifically, for example, the recognition unit 35 recognizes the face, age, sex, and the like of men or animals based on images taken by a camera 62 for signage. For offices, the recognition unit 35 performs name tagging by face recognition and processing of replacing a background image based on images taken by the camera 62. The recognition unit 35 stores recognition information indicating the recognized details in the storage unit 2000. The recognition unit 35 achieves speeding up by performing processing with a recognition expansion board.

The delay information acquisition unit 37a is used for the processing of upstream channel adaptive control correspondingly to a delay information acquisition unit 57 of the communication terminal 5 for use in the processing of downstream channel adaptive control. Specifically, the delay information acquisition unit 37a acquires transmission delay time information (d1) indicating transmission delay time d1 from the decoding unit 40 and holds it for a certain period of time, and when a plurality of pieces of transmission delay time information (d1) are acquired, outputs to the channel adaptive controller 37b transmission delay time information (d) indicating frequency distribution information by a plurality of pieces of transmission delay time d1. The transmission delay time information (d1) indicates time from the point when the video (sound) data is transmitted from the communication terminal 5 to the point when it is received by the distribution control system 2.

The channel adaptive controller 37b is used for the processing of the upstream channel adaptive control correspondingly to the channel adaptive controller 27 for use in the processing of the downstream channel adaptive control. Specifically, the channel adaptive controller 37b calculates the operation conditions of the encoding unit 60 of the communication terminal 5 based on the transmission delay time information (d). The channel adaptive controller 37b transmits a channel adaptive control signal indicating operation conditions such as a frame rate and data resolution to the encoding unit 60 of the communication terminal 5 through the transmitter/receiver 31 and the transmitter/receiver 51.

The decoding unit 40 decodes the video (sound) data transmitted from the communication terminal 5. The decoding unit 40 also outputs the transmission delay time information (d1) indicating transmission delay time d1 to the delay information acquisition unit 37a.

Functional configuration of communication terminal

Figure 10:
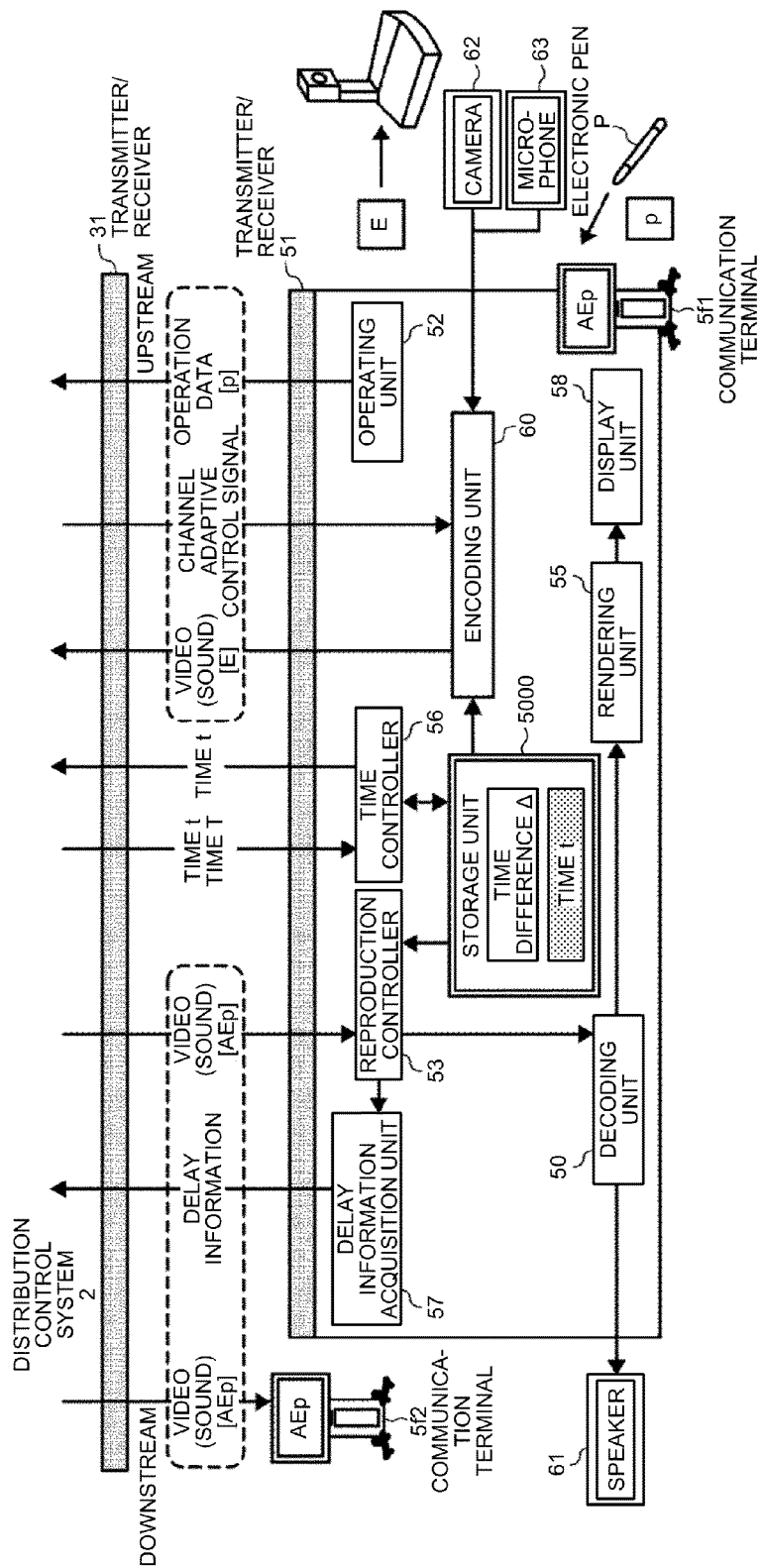
FIG. 10 is a functional block diagram illustrating mainly the functions of the communication terminal.

Described next with reference to FIG. 10 is the functional configuration of the communication terminal 5. FIG. 10 is a functional block diagram illustrating mainly the functions of the communication terminal. The communication terminal 5 is a terminal serving as an interface for a user to perform a login to the distribution system 1, start and stop the distribution of video (sound) data, and the like.

As illustrated in FIG. 10, the communication terminal 5 has functional components illustrated in FIG. 10 by the hardware configuration including the CPU 201 and the programs illustrated in FIG. 7. When the communication terminal 5 becomes communicable with the other terminals and systems through the communication network 9 by the insertion of the dangle 99 as illustrated in FIG. 2, the communication terminal 5 has the functional components illustrated in FIG. 10 by the hardware configuration and the programs illustrated in FIG. 7 and FIG. 8.

Specifically, the communication terminal 5 includes a decoding unit 50, the transmitter/receiver 51, an operating unit 52, the reproduction controller 53, a rendering unit 55, a time controller 56, the delay information acquisition unit 57, a display unit 58, and the encoding unit 60. The communication terminal 5 further includes a storage unit 5000 constructed by the RAM 203 illustrated in FIG. 7. This storage unit 5000 stores therein time difference information ($\Delta$) indicating a time difference $\Delta$ described below and time information (t) indicating time t in the communication terminal 5.

Among these, the decoding unit 50 decodes video (sound) data distributed from the distribution control system 2 and output from the reproduction controller 53.

The transmitter/receiver 51 transmits and receives various data, requests, and the like to and from the transmitter/receiver 31 of the distribution control system 2 and a transmitter/receiver 71a of the terminal management system 7. For example, in the login processing of the communication terminal 5, the transmitter/receiver 51 performs a login request to the transmitter/receiver 71a of the terminal management system 7 based on the startup of the communication terminal 5 by the operating unit 52.

The operating unit 52 performs processing to receive operation input by a user, for example, receives input, selection, or the like with a power switch, a keyboard, a mouse, the electronic pen P, or the like, and transmits it as operation data to the browser management unit 22 of the distribution control system 2.

The reproduction controller 53 buffers the video (sound) data (a packet of real-time data) received from the transmitter/receiver 51 and outputs it to the decoding unit 50 considering reproduction delay time U. The reproduction controller 53 also calculates the transmission delay time information (D1) indicating transmission delay time D1, and outputs the transmission delay time information (D1) to the delay information acquisition unit 57.

The rendering unit 55 renders the data decoded by the decoding unit 50.

The time controller 56 performs time adjustment processing in conjunction with the time acquisition unit 26 of the distribution control system 2. Specifically, the time controller 56 acquires time information (t) indicating time t in the communication terminal 5 from the storage unit 5000. The time controller 56 issues a request for time information (T) indicating time T in the distribution control system 2 to the time acquisition unit 26 of the distribution control system 2 through the transmitter/receiver 51 and the transmitter/receiver 31. In this case, the time information (t) is transmitted concurrently with the request for the time information (T).

The delay information acquisition unit 57 acquires from the reproduction controller 53 transmission delay time information (D1) indicating transmission delay time D1 and holds it for a certain period of time, and when a plurality of pieces of transmission delay time information (D1) are acquired, outputs transmission delay time information (D) indicating frequency distribution information by a plurality of pieces of transmission delay time D1 to the channel adaptive controller 27 through the transmitter/receiver 51 and the transmitter/receiver 31. The transmission delay time information (D) is transmitted, for example, once in a hundred frames.

The display unit 58 reproduces the data rendered by the rendering unit 55.

The encoding unit 60 transmits video (sound) data [E] that is acquired from a built-in microphone 213 or the camera 62 and a microphone 63, which are externally attached, and is encoded, time information ($t_0$) indicating the current time $t_0$ in the communication terminal 5 acquired from the storage unit 5000, and the time difference information ($\Delta$) indicating the time difference $\Delta$ acquired from the storage unit 5000 to the decoding unit 40 of the distribution control system 2 through the transmitter/receiver 51 and the transmitter/receiver 31. The time difference $\Delta$ indicates a difference between the time managed independently by the distribution control system 2 and the time managed independently by the communication terminal 5. The encoding unit 60 changes the operation conditions of the encoding unit 60 based on the operation conditions indicated by the channel adaptive control signal received from the channel adaptive controller 37b. The encoding unit 60, in accordance with the new operation conditions, transmits the video (sound) data [E] that is acquired from the camera 62 and the microphone 63 and is encoded, the time information ($t_0$) indicating the current time $t_0$ in the communication terminal 5 acquired from the storage unit 5000, and the time difference information ($\Delta$) indicating the time difference $\Delta$ acquired from the storage unit 5000 to the decoding unit 40 of the distribution control system 2 through the transmitter/receiver 51 and the transmitter/receiver 31.

The built-in microphone 213, the externally attached camera 62 and the microphone 63, and the like are examples of an inputting unit and are devices that need encoding and decoding. The inputting unit may output touch data and smell data in addition to video (sound) data.

The inputting unit includes various sensors such as a temperature sensor, a direction sensor, an acceleration sensor, and the like.

Functional Configuration of the Terminal Management System

Figure 11:
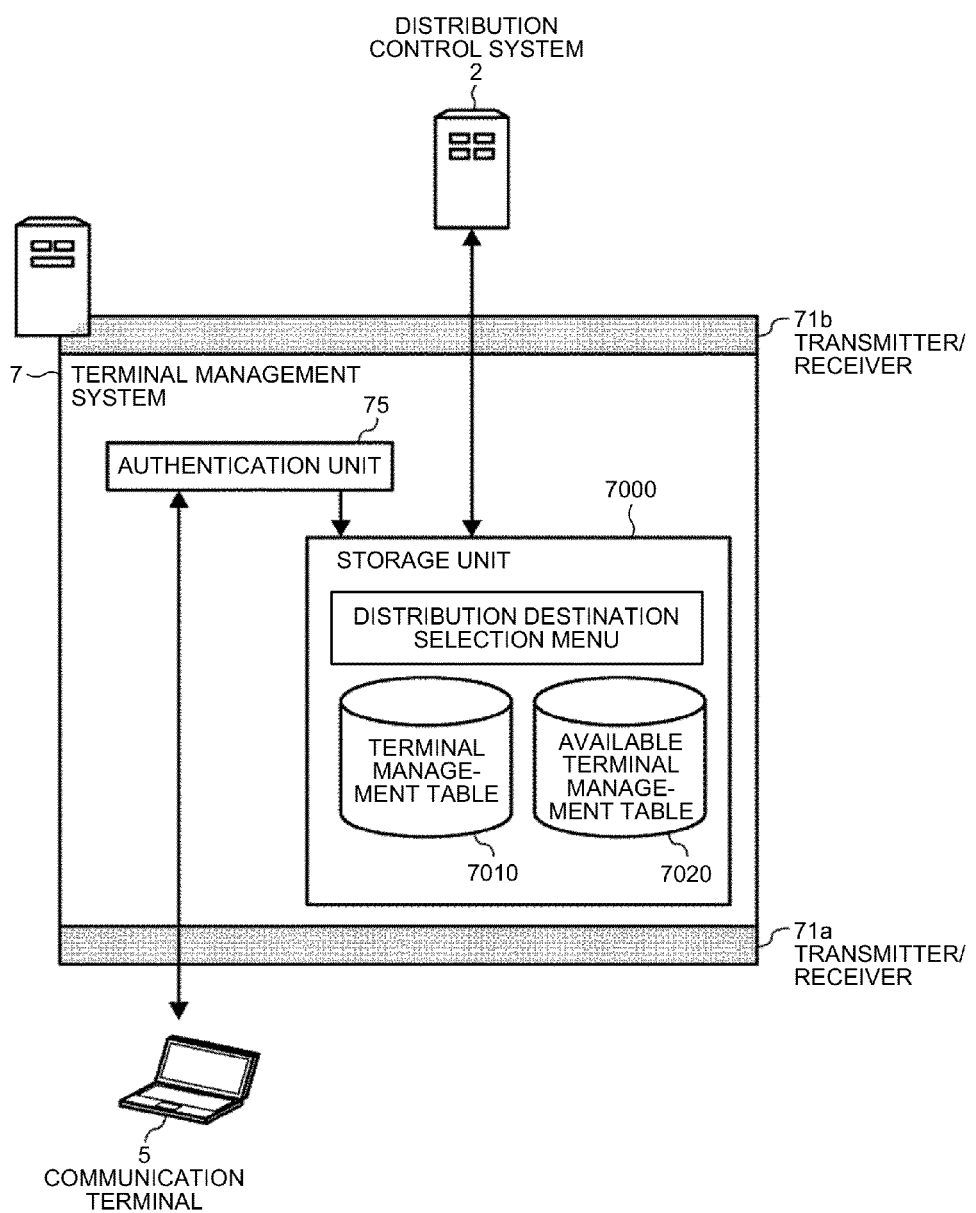
FIG. 11 is a functional block diagram illustrating the functions of the terminal management system.

Described next with reference to FIG. 11 is the functional configuration of the terminal management system 7. FIG. 11 is a functional block diagram illustrating the functions of the terminal management system.

As illustrated in FIG. 11, the terminal management system 7 has functional components illustrated in FIG. 11 by the hardware configuration including the CPU 201 and the programs illustrated in FIG. 7.

Specifically, the terminal management system 7 includes the transmitter/receiver 71a, a transmitter/receiver 71b, and an authentication unit 75. The terminal management system 7 further includes a storage unit 7000 constructed by the HDD 204 illustrated in FIG. 7. The storage unit 7000 stores therein distribution destination selection menu data, a terminal management table 7010, and an available terminal management table 7020.

Among these, the distribution destination selection menu is data indicating such a destination selection menu screen as illustrated in FIG. 12.

As illustrated in FIG. 13, the terminal management table 7010 manages the terminal ID of the communication terminal 5, a user certificate, contract information when a user uses the services of the distribution system 1, the terminal type of the communication terminal 5, setting information indicating the home uniform resource locators (URLs) of the respective communication terminals 5, the execution environment information of the respective communication terminals 5, a shared ID, installation position information, and display name information in association with each other. Among these, the execution environment information includes "favorites", "previous Cookie information", and "cache file" of the respective communication terminals 5, which are sent to the distribution control system 2 together with the setting information after the login of each communication terminal 5 and are used for performing an individual service on each communication terminal 5.

The shared ID is an ID that is used when each user distributes the same video (sound) data as video (sound) data being distributed to his/her own communication terminal 5 to the other communication terminals 5, thereby performing remote sharing processing and is identification information that identifies the other communication terminals and the other communication terminal group. For example, the shared ID of the terminal ID "t006" is "v006", the shared ID of the terminal ID "t007" "v006", and the shared ID of the terminal ID "t008" is "v006". When a request for remote sharing processing with the communication terminals (5/1, 5/2, 5/3) with the terminal ID "v006" is issued from the communication terminal 5a with the terminal ID "t001", the distribution control system 2 distributes the same video (sound) data as video (sound) data being distributed to the communication terminals 5a to the communication terminals (5/1, 5/2, 5/3). However, when the communication terminals 5a and the communication terminals (5/1, 5/2, 5/3) are different in the resolution of the display unit 58, the distribution control system 2 distributes the video (sound) data accordingly.

As illustrated in FIG. 5, for example, the installation position information indicates an installation position when the communication terminals (5/1, 5/2, 5/3) are arranged side by side. The display name information is information indicating the details of the display name in the distribution destination selection menu illustrated in FIG. 12.

The available terminal management table 7020 manages, in association with each terminal ID, a shared ID indicating a communication terminal or a communication terminal group with which the communication terminal 5 indicated by the terminal ID can perform remote sharing processing.

Described next returning back to FIG. 11 is the functional components.

The transmitter/receiver 71a transmits and receives various data, requests, and the like to and from the communication terminal 5. For example, the transmitter/receiver 71a receives a login request from the transmitter/receiver 51 of the communication terminal 5 and transmits an authentication result of the login request to the transmitter/receiver 51.

The transmitter/receiver 71b transmits and receives various data, requests, and the like to and from the distribution control system 2. For example, the transmitter/receiver 71b receives a request for the data of the distribution destination selection menu from the transmitter/receiver 21 of the distribution control system 2 and transmits the data of the distribution destination selection menu to the transmitter/receiver 21.

The authentication unit 75 searches the terminal management table 7010 based on the terminal ID and the user certificate received from the communication terminal 5, thereby determining whether there are any terminal ID and user certificate of the same combination, thereby authenticating the communication terminal 5.

Operations or Processing of the Embodiment

Described next with reference to FIG. 17 to FIG. 24 are operations or pieces of processing of the present embodiment. These pieces of processing are performed by the respective CPUs of the distribution control system 2, the communication terminal 5, the terminal management system 7, and the web server 8 in accordance with the respective programs stored therein.

Basic Distribution Processing

Figure 17:
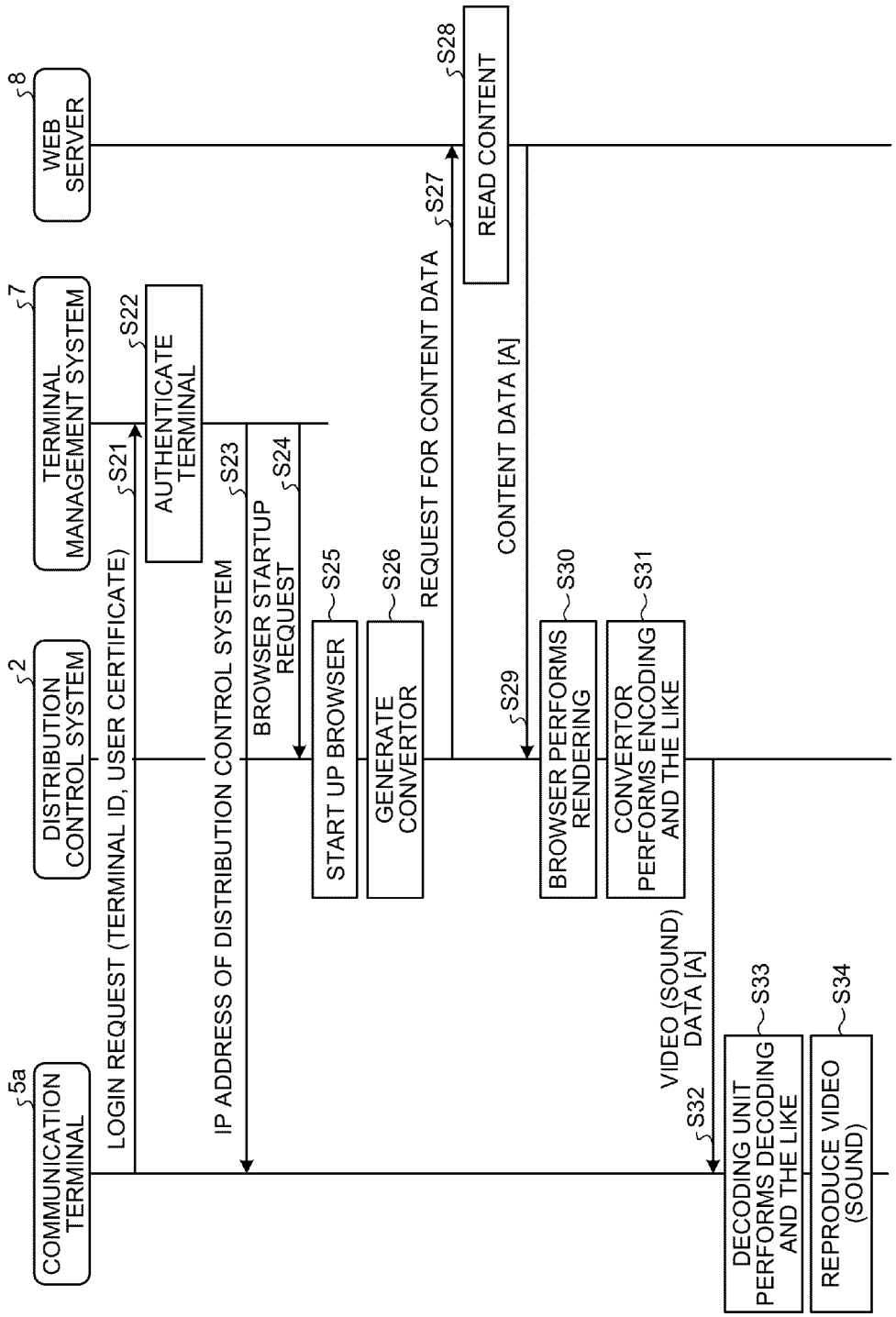
FIG. 17 is a sequence diagram illustrating the basic distribution processing of the distribution control system.

Described first with reference to FIG. 17 is specific distribution processing in the basic distribution method illustrated in FIG. 3. FIG. 17 is a sequence diagram illustrating the basic distribution processing of the distribution control system. Although described here is a case of issuing a login request using the communication terminal 5a, a login may be performed using the communication terminal 5 other than the communication terminal 5a.

As illustrated in FIG. 17, when a user turns on the communication terminal 5a, the transmitter/receiver 51 of the communication terminal 5a issues a login request to the transmitter/receiver 71a of the terminal management system (Step S21). This causes the transmitter/receiver 71a to receive the login request. This login request includes the terminal ID and the user certificate of the communication terminal 5a. The authentication unit 75 then acquires the terminal ID and the user certificate of the communication terminal 5a.

The authentication unit 75 searches the terminal management table 7010 based on the terminal ID and the user certificate, thereby determining whether there are any terminal ID and user certificate of the same combination, thereby authenticating the communication terminal 5a (Step S22). Described below continuously is a case when the terminal ID and the user certificate of the same combination are present in the terminal management table 7010, that is, when the communication terminal 5a is determined as a proper terminal in the distribution system 1.

The transmitter/receiver 71a of the terminal management system 7 transmits the IP address of the distribution control system 2 to the transmitter/receiver 51 of the communication terminal 5a (Step S23). The IP address of the distribution control system 2 is acquired from the distribution control system 2 by the terminal management system 7 and is stored in the storage unit 7000 in advance.

The transmitter/receiver 71b of the terminal management system 7 issues a browser 20 startup request to the transmitter/receiver 21 of the distribution control system 2 (Step S24). This causes the transmitter/receiver 21 to receive the browser 20 startup request. The browser management unit 22 starts up the browser 20 based on the startup request received by the transmitter/receiver 21 (Step S25).

The generating/selecting unit 310 of the encoder bridge unit 30 generates the convertor 10 in accordance with the reproduction capability of the communication terminal 5a (the resolution of the display and the like) and the type of content (Step S26). Next, the transmitter/receiver 21 issues a request for content data [A] to the web server 8 in accordance with an instruction by the browser 20 (Step S27). In response thereto, the web server 8 reads the requested content data [A] from its own storage unit (not illustrated) (Step S28). The web server 8 then transmits the content data [A] to the transmitter/receiver 21 of the distribution control system 2 (Step S29).

The browser 20 renders the content data [A] received the transmitter/receiver 21, thereby generating pieces of frame data as pieces of still image (sound) data and outputs them to the transmission FIFO 24 (Step S30). The convertor 10 encodes the pieces of frame data stored in the transmission FIFO 24, thereby converting them into video (sound) data [A] to be output to the communication terminal 5a (Step S31).

The transmitter/receiver 31 transmits the video (sound) data to the transmitter/receiver 51 of the communication terminal 5a (Step S32). This causes the transmitter/receiver 51 of the communication terminal 5a to receive the video (sound) data [A] and output it to the reproduction controller 53.

In the communication terminal 5a, the decoding unit 50 acquires the video (sound) data [A] from the reproduction controller 53 and decodes it (Step S33). After that, a speaker 61 reproduces a sound based on decoded sound data [A], and the display unit 58 reproduces video based on video data [A] acquired from the decoding unit 50 and rendered by the rendering unit 55 (Step S34).

Figure 18:
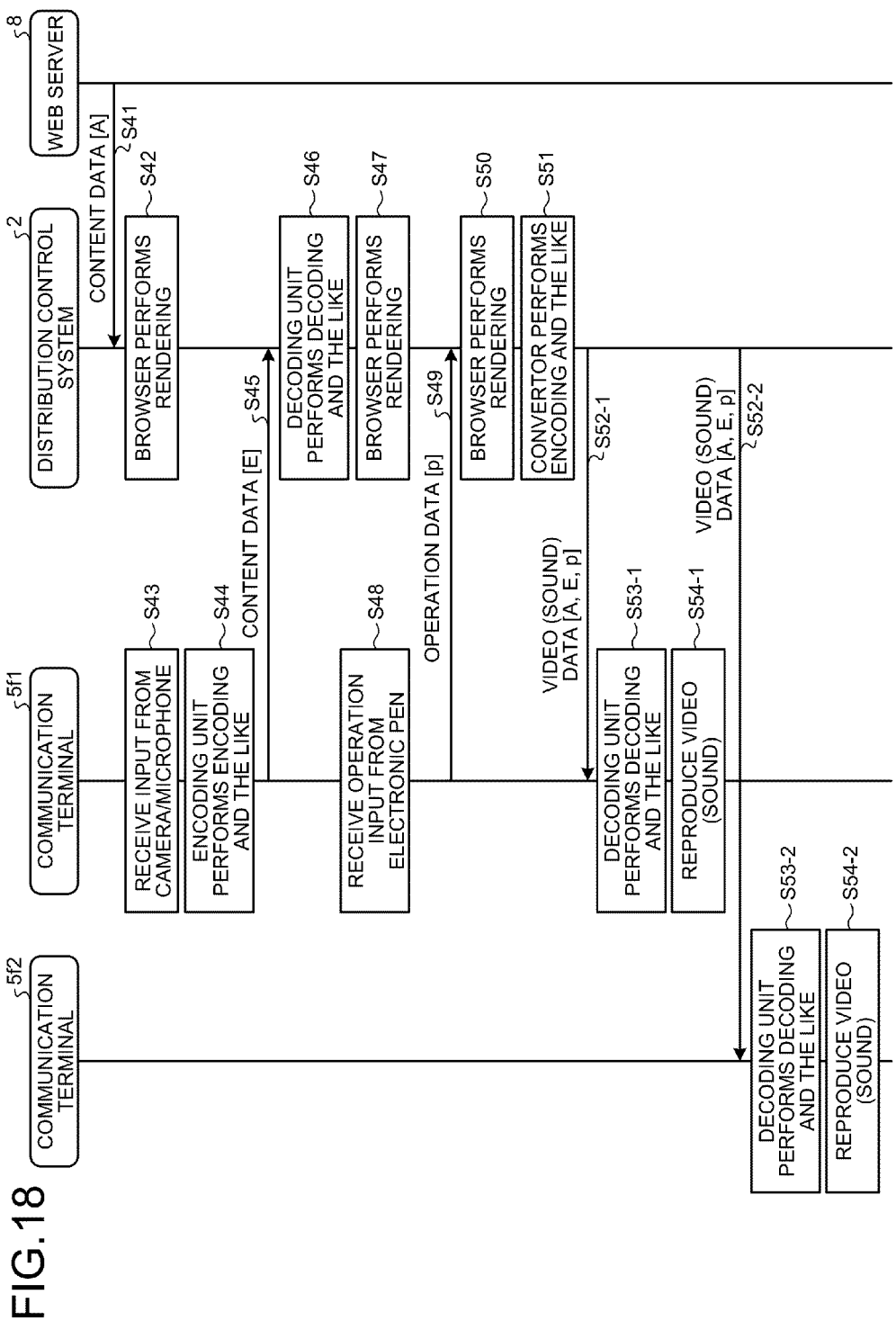
FIG. 18 is a sequence diagram illustrating communication processing using a plurality of communication terminals through the distribution control system.

Processing of Composite Distribution Using a Plurality of Communication Terminals Described next with reference to FIG. 18 is communication processing using a plurality of communication terminals through the distribution control system. FIG. 18 is a sequence diagram illustrating distribution processing using a plurality of communication terminals through the distribution control system. Described here is specific processing for the pattern illustrated in FIG. 6 as the communication terminals 5. Because login processing, browser startup, and the like similar to Steps S21 to S29 are performed also here, described first is processing corresponding to Step S29.

As illustrated in FIG. 18, the transmitter/receiver 21 of the distribution control system 2 receives content data [A] from the web server 8 (Step S41). The browser 20 renders the content data [A], thereby generating pieces of frame data as pieces of sill image (sound) data and outputs them to the transmission FIFO 24 (Step S42).

When the encoding unit 60 of the communication terminal 5f1 receives the input of content data as video (sound) data [E] from the camera 62 and the microphone 63 (Step S43), the encoding unit 60 encodes the content data [E] (Step S44). The transmitter/receiver 51 transmits the content data [E] encoded by the encoding unit 60 to the transmitter/receiver 31 of the distribution control system 2 (Step S45). This causes the transmitter/receiver 31 of the distribution control system 2 to receive the content data [E].

The decoding unit 40 of the distribution control system 2 decodes the content data [E] received by the transmitter/receiver 31 and outputs it to the reception FIFO 34 (Step S46). The browser 20 renders the content data [E] stored in the reception FIFO 34, thereby generating pieces of frame data [E] as pieces of still image (sound) data and outputs it to the transmission FIFO 24 (Step S47). In this case, the browser 20 outputs with a layout in which the content data [E] is combined with the content data [A] that is already acquired.

In addition, when the operating unit 52 of the communication terminal 5f1 receives the input of a stroke operation with the electronic pen P1 (Step S48), the transmitter/receiver 51 transmits operation data [p] indicating the details of the stroke operation received by the operating unit 52 to the transmitter/receiver 31 of the distribution control system 2 (Step S49). This causes the transmitter/receiver 31 of the distribution control system 2 to receive the operation data [p]. The browser management unit 22 outputs the operation data [p] received the transmitter/receiver 31 to the browser 20.

The browser 20 renders the operation data [p], thereby generating pieces of frame data [p] as pieces of still image (sound) data and outputs them to the transmission FIFO 24 (Step S50). In this case, browser 20 outputs with a layout in which the operation data [p] is combined with the content data ([A], [E]) that is already acquired.

The convertor 10 encodes pieces of frame data ([A], [E], [p]) as pieces of still image (sound) data stored in the transmission FIFO 24, thereby converting them into video (sound) data ([A], [E], [p]) to be distributed to the communication terminal 5a (Step S51).

The transmitter/receiver 31 acquires the encoded video (sound) data ([A], [E], [p]) from the encoder bridge unit 30 including the convertor 10 and transmits it to the transmitter/receiver 51 of the communication terminal 5f1 (Step S52-1). This causes the transmitter/receiver 51 of the communication terminal 5f1 to receive the video (sound) data ([A], [E], [p]) and causes the reproduction controller 53 of the communication terminal 5f1 to acquire the video (sound) data ([A], [E], [p]) from the transmitter/receiver 51. In the communication terminal 5f1, the decoding unit 50 acquires the video (sound) data ([A], [E], [p]) from the reproduction controller 53 and decodes it (Step S53-1). After that, the speaker 61 reproduces a sound based on decoded sound data ([A], [E]), and the display unit 58 reproduces video based on video data ([A], [E], [p] acquired from the decoding unit 50 and rendered by the rendering unit 55 (Step S54-1).

For also the communication terminal 5f2, as is the case with Step S52-1, the transmitter/receiver 31 acquires the encoded video (sound) data ([A], [E], [p]) from the encoder bridge unit 30 and transmits it to the transmitter/receiver 51 of the communication terminal 5f2 (Step S52-2). This causes the reproduction controller 53 of the communication terminal 5f2 to acquire the video (sound) data ([A], [E], [p]). In the communication terminal 5f1, the decoding unit 50 acquires the video (sound) data ([A], [E], [p]) from the reproduction controller 53 and decodes it (Step S53-2). After that, the speaker 61 reproduces a sound based on decoded sound data ([A], [E]), and the display unit 58 reproduces video based on video data ([A], [E], [p] acquired from the decoding unit 50 and rendered by the rendering unit 55 (Step S54-1).

Thus, the same video (sound) as the video (sound) output to the communication terminal 5f1 is output also to the communication terminal 5f2.

Processing of Time Adjustment

Figure 19:
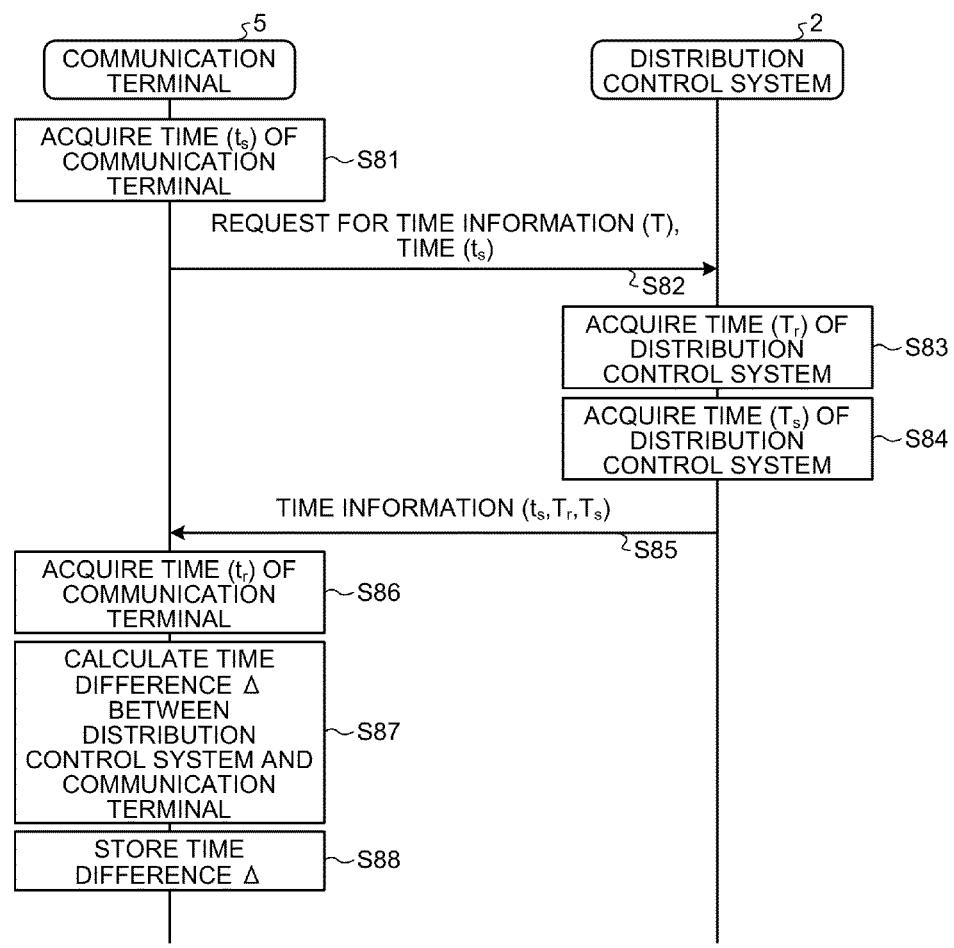
FIG. 19 is a sequence diagram illustrating the processing of time adjustment.

Described next with reference to FIG. 19 is the processing of time adjustment. FIG. 19 is a sequence diagram illustrating the processing of time adjustment.

In order to acquire time indicating a point in time when the transmitter/receiver 51 issues a request for the time information (T) to the distribution control system 2, the time controller 56 of the communication terminal 5 acquires time information ($t_s$) in the communication terminal 5 from the storage unit 5000 (Step S81). The transmitter/receiver 51 issues a request for the time information (T) to the transmitter/receiver 31 (Step S82). In this case, the time information ($t_s$) is transmitted concurrently with the request for the time information (T).

In order to acquire time indicating a point in time when the transmitter/receiver 31 received the request at Step S82, the time acquisition unit 26 of the distribution control system 2 acquires time information ($T_r$) in the distribution control system 2 from the time management unit 25 (Step S83). In order to acquire time indicating a point in time when the transmitter/receiver 31 responds to the request at Step S82, the time acquisition unit 26 further acquires time information ($T_s$) in the distribution control system 2 from the time management unit 25 (Step S84). The transmitter/receiver 31 then transmits the time information (t, T, $T_s$) to the transmitter/receiver 51 (Step S85).

In order to acquire time indicating a point in time when the transmitter/receiver 51 received the response at Step S85, the time controller 56 of the communication terminal 5 acquires time information ($t_r$) in the communication terminal 5 from the storage unit 5000 (Step S86).

The time controller 56 of the communication terminal 5 calculates the time difference Δ between the distribution control system 2 and the communication terminal 5 (Step S87). This time difference Δ is represented by Equation (I) below.

$$\Delta = ((T_r + T_s)/2) - ((t_r + t_s)/2) \quad (1)$$

The time controller 56 stores the time difference information (Δ) indicating the time difference Δ in the storage unit 5000 (Step S88). The series of processing of time adjustment is performed, for example, regularly every minute.

Processing of Downstream Channel Adaptive Control

Figure 20:
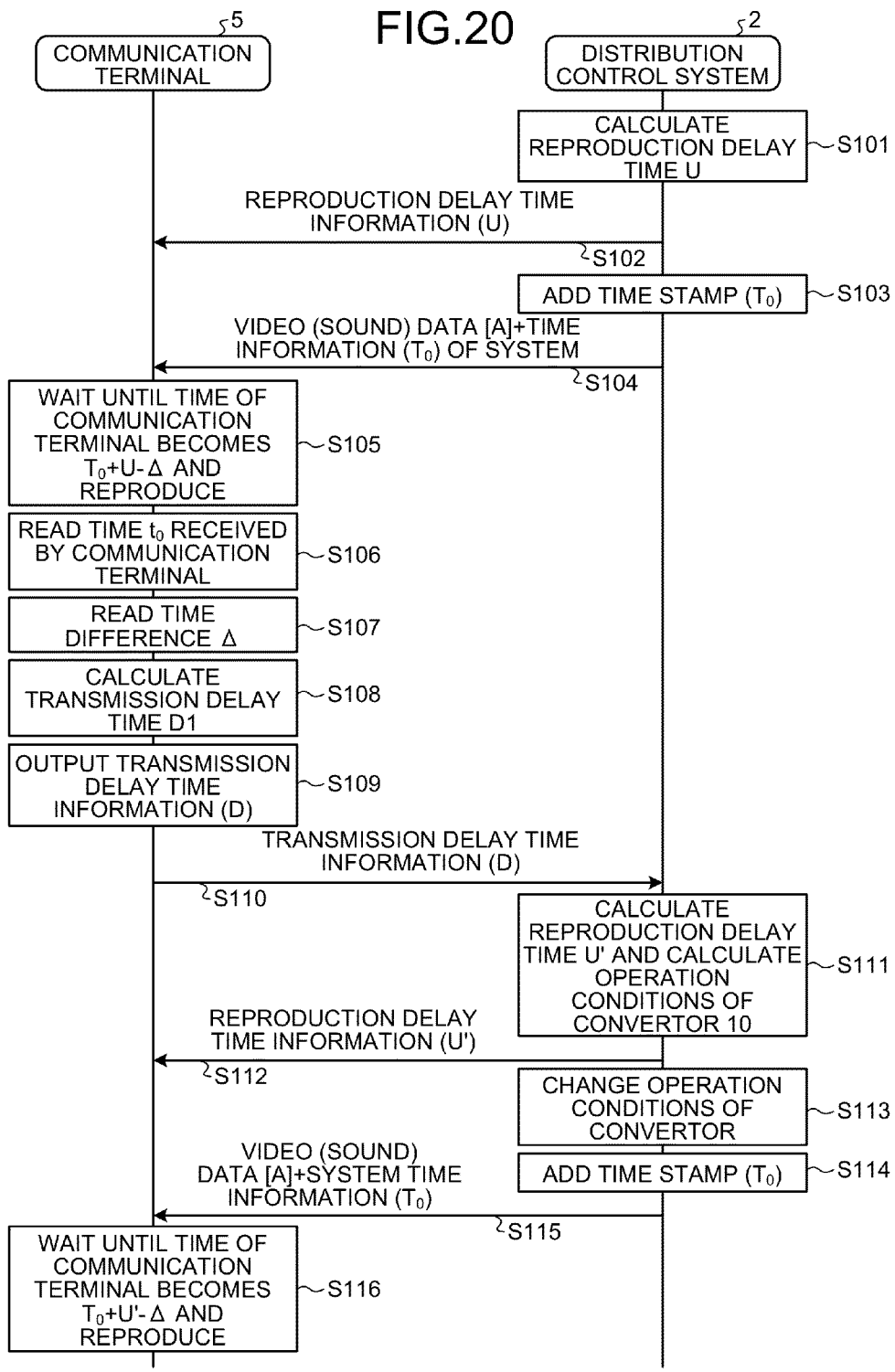
FIG. 20 is a sequence diagram illustrating the processing of channel adaptive control on data transmitted from the distribution control system to the communication terminal.

Described next with reference to FIG. 20 is the processing of channel adaptive control on data transmitted from the distribution control system 2 to the communication terminal 5 (downstream). FIG. 20 is a sequence diagram illustrating the processing of channel adaptive control on data transmitted from the distribution control system to the communication terminal.

First, the channel adaptive controller 27 of the distribution control system 2 calculates reproduction delay time information (U) indicating reproduction delay time U for delaying reproduction by buffering until the reproduction controller 53 of the communication terminal 5 reproduces video (sound) data and outputs it to the encoder bridge unit 30 (Step S101).

The transmitter/receiver 31 acquires the reproduction delay time information (U) from the encoder bridge unit 30 and transmits it to the transmitter/receiver 51 of the communication terminal 5 (Step S102). This causes the transmitter/receiver 51 of the communication terminal 5 to receive the reproduction delay time information (U). The encoder bridge unit 30 adds time information ($T_0$) indicating time $T_0$ indicating a point in time acquired from the time management unit 25 as a time stamp to the video (sound) data acquired from the transmission FIFO 24 and encoded, for example (Step S103). The transmitter/receiver 31 transmits the video (sound) data and the time information ($T_0$) of the distribution control system 2 to the transmitter/receiver 51 of the communication terminal 5 (Step S104). This causes the transmitter/receiver 51 of the communication terminal 5 to receive the time information ($T_0$) of the distribution control system 2 and to output the video (sound) data and the time information ($T_0$) to the reproduction controller 53.

In the communication terminal 5, based on the reproduction delay time information (U) acquired at Step S102, the time information ($T_0$) acquired at Step S104, and the time difference information (Δ) stored in the storage unit 5000 at Step S88, the reproduction controller 53 waits until the time ($T_0$+U−Δ) in the communication terminal 5 and then outputs the video (sound) data acquired at Step S104 to the decoding unit 50, thereby causing the speaker 61 to output a sound and the display unit 58 to reproduce video through the rendering unit 55 (Step S105). This causes only video (sound) data the communication terminal 5 received within the range of the reproduction delay time U represented by Equation (2) below to be reproduced, while video (sound) data out of the range is too delayed and is deleted without being reproduced.

$$U \geq (t_0 + \Delta) - T_0 \quad (2)$$

The reproduction controller 53 reads the current time $t_0$ in the communication terminal 5 from the storage unit 5000 (Step S106). This time $t_0$ indicates time in the communication terminal 5 at a point in time when the communication terminal 5 received video (sound) data from the distribution control system 2. The reproduction controller 53 further reads the time difference information (Δ) indicating the time difference Δ stored at Step S88 from the storage unit 5000 (Step S107). The reproduction controller 53 then calculates transmission delay time D1 indicating time from when the video (sound) data is transmitted from the distribution control system 2 to when it is received by the communication terminal 5 (Step S108). This calculation is performed by Equation (3) below; when the communication network 9 becomes congested, the transmission delay time D1 becomes longer.

$$D1 = (t_0 + \Delta) - T_0 \quad (3)$$

The delay information acquisition unit 57 acquires transmission delay time information (D1) indicating the transmission delay time D1 from the reproduction controller 53 and holds it for a certain period of time, and when a plurality of pieces of transmission delay time information (D1) are acquired, outputs to the transmitter/receiver 51 transmission delay time information (D) indicating frequency distribution information by a plurality of pieces of transmission delay time D1 (Step S109). The transmitter/receiver 51 transmits the transmission delay time information (D) to the transmitter/receiver 31 of the distribution control system 2 (Step S110). This causes the transmitter/receiver 31 of the distribution control system 2 to receive the transmission delay time information (D) and to output the transmission delay time information (D) to the channel adaptive controller 27.

The channel adaptive controller 27 of the distribution control system 2 newly calculates reproduction delay information U' based on the transmission delay time information (D) and calculates the operation conditions such as the frame rate and the data resolution of the convertor 10 and outputs them to the encoder bridge unit 30 (Step S111). In other words, the channel adaptive controller 27 changes the operation of the encoder bridge unit 30 based on the transmission delay time information (D) and the size of the data (e.g., the number of bits or the number of bytes).

The transmitter/receiver 31 acquires reproduction delay time information (U') indicating the new reproduction delay time U' calculated at Step S111 from the encoder bridge unit 30 and transmits the reproduction delay time information (U') to the transmitter/receiver 51 of the communication terminal 5 (Step S112). This causes the transmitter/receiver 51 of the communication terminal 5 to receive the reproduction delay time information (U').

The convertor 10 of the encoder bridge unit 30 further changes the operation conditions of the convertor 10 based on the channel adaptive control signal indicating the operation conditions (Step S113). For example, when the transmission delay time D1 is too long, when the reproduction delay time U is made longer in accordance with the transmission delay time D1, reproduction time at the speaker 61 and the display unit 58 becomes too delayed. As a result, there is a limit to making the reproduction delay time U longer. In view of this, the channel adaptive controller 27 not only causes the encoder bridge unit 30 to change the reproduction delay time U to be the reproduction delay time U' but also causes the convertor 10 to decrease the frame rate of video (sound) data and to decrease the resolution of video (sound) data, thereby addressing the congestion of the communication network 9. This causes the encoder bridge unit 30, as with Step S103, to add the current time information ($T_0$) to the video (sound) data [A] as a time stamp in accordance with the operation conditions after being changed. The video (sound) data is added (Step S114). The transmitter/receiver 31 transmits the video (sound) data and the time information ($T_0$) of the distribution control system 2 to the transmitter/receiver 51 of the communication terminal 5 (Step S115). This causes the transmitter/receiver 51 of the communication terminal 5 to receive the video (sound) data and the time information ($T_0$) of the distribution control system 2 and to output the video (sound) data and the time information ($T_0$) to the reproduction controller 53.

In the communication terminal 5, based on the reproduction delay time information (U') acquired at Step S112, the time information ($T_0$) acquired at S115, and the time difference information ($\Delta$) stored in the storage unit 5000 at Step S88, the reproduction controller 53 waits until the time ($T_0$+ U'−$\Delta$) in the communication terminal 5 and then outputs the video (sound) data to the decoding unit 50, thereby, as with Step S105, causing the speaker 61 to output a sound and the display unit 58 to reproduce video through the rendering unit 55 (Step S116). After that, the processing at and after Step S106 is performed continuously. Thus, the processing of the downstream channel adaptive control is performed continuously.

Processing of Upstream Channel Adaptive Control

Figure 21:
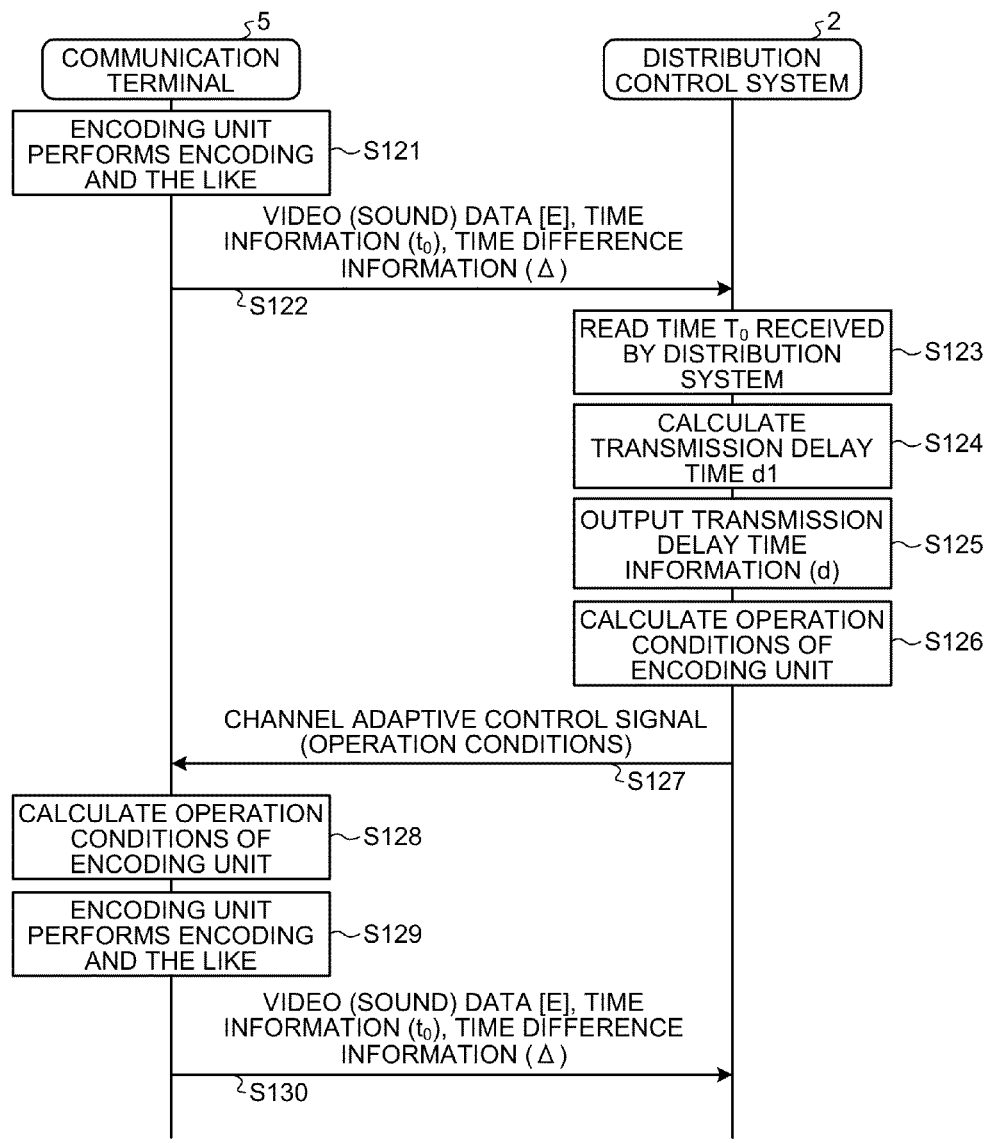
FIG. 21 is a sequence diagram illustrating the processing of channel adaptive control on data transmitted from the communication terminal to the distribution control system.

Described next with reference to FIG. 21 is the processing of channel adaptive control on data transmitted from the communication terminal 5 to the distribution control system 2 (upstream). FIG. 20 is a sequence diagram illustrating the processing of channel adaptive control on data transmitted from the communication terminal to the distribution control system.

First, the encoding unit 60 of the communication terminal 5 encodes content data as video (sound) data [E] input from the camera 62 and the microphone 63 (Step S121). In this situation, the encoding unit 60 acquires the time information ($t_0$) indicating the current time $t_0$ in the communication terminal 5 and the time difference information ($\Delta$) indicating the time difference $\Delta$ from the storage unit 5000 and does not encode them. The transmitter/receiver 51 transmits the video (sound) data [E], the time information ($t_0$), and the time difference information ($\Delta$) to the transmitter/receiver 31 of the distribution control system 2 (Step S122). This causes the transmitter/receiver 31 of the distribution control system 2 to receive the video (sound) data [E], the time information ($t_0$), and the time difference information ($\Delta$).

In the distribution control system 2, the decoding unit 40 reads time $T_0$ indicating a point in time when the video (sound) data [E] and the like were received at Step S112 from the time management unit 25 (Step S123). The decoding unit 40 then calculates transmission delay time d1 indicating time from when the video (sound) data is transmitted from the communication terminal 5 to when it is received by the distribution control system 2 (Step S124). This calculation is performed by Equation (4) below; when the communication network 9 becomes congested, the transmission delay time d1 becomes longer.

$$d1 = T_0 - (t_0 + \Delta) \quad (4)$$

As is the case with the delay information acquisition unit 57, the delay information acquisition unit 37a of the distribution control system 2 acquires transmission delay time information (d1) indicating transmission delay time d1 from the decoding unit 40 and holds it for a certain period of time, and when a plurality of pieces of transmission delay time information (d1) are acquired, outputs to the channel adaptive controller 37b transmission delay time information (d) indicating frequency distribution information by a plurality of pieces of transmission delay time d1 (Step S125).

Based on the transmission delay time information (d), the channel adaptive controller 37b calculates the operation conditions of the encoding unit 60 (Step S126). The transmitter/receiver 31 transmits a channel adaptive control signal indicating operation conditions such as a frame rate and data resolution to the transmitter/receiver 51 of the communication terminal 5 (Step S217). This causes the transmitter/receiver 51 of the communication terminal 5 to receive the channel adaptive control signal. In other words, in the case of the channel adaptive control illustrated in FIG. 20 (downstream), the channel adaptive signal is output to the encoder bridge unit 30 within the same distribution control system 2, and in contrast, in the case of the channel adaptive control illustrated in FIG. 21 (upstream), the channel adaptive signal is transmitted to the communication terminal 5 from the distribution control system 2 through the communication network 9.

Based on the operation conditions received by the transmitter/receiver 51, the encoding unit 60 changes the operation conditions of the encoding unit 60 (Step S128). The encoding unit 60 then performs the same processing as Step S121 based on the new operation conditions (Step S129). The transmitter/receiver 51, as with Step S122, transmits the video (sound) data [E] acquired from the camera 62 and the microphone 63 and encoded, the time information ($t_0$) indicating the current time $t_0$ in the communication terminal 5 acquired from the storage unit 5000, and the time difference information ($\Delta$) indicating the time difference $\Delta$ also acquired from the storage unit 5000 to the transmitter/receiver 31 of the distribution control system 2 (Step S130). This causes the transmitter/receiver 31 of the distribution control system 2 to receive the video (sound) data [E], the time information ($t_0$), and the time difference information ($\Delta$). After that, the processing at and after Step S123 is performed continuously. Thus, the processing of the upstream channel adaptive control is performed continuously.

Processing of Multidisplay

Figure 22:
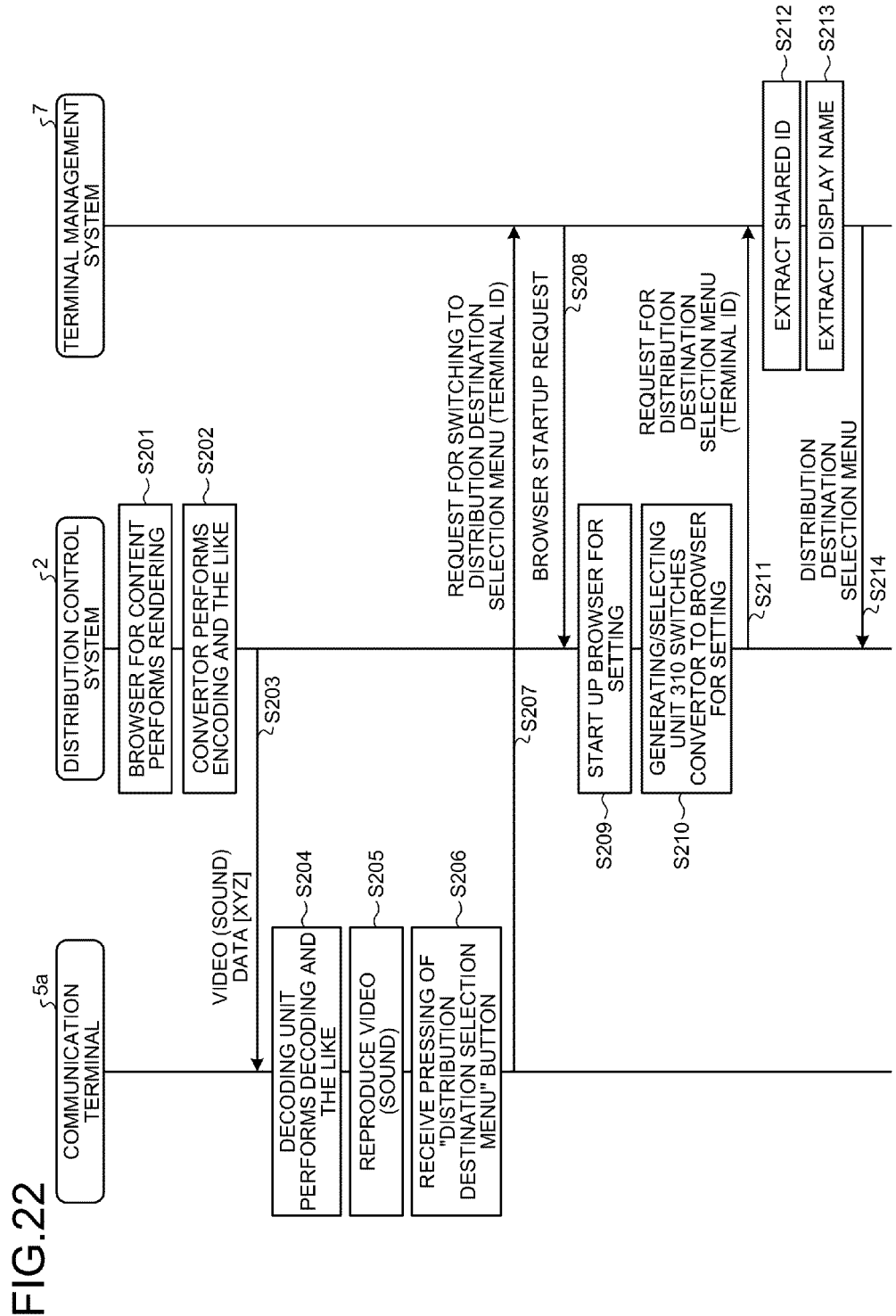
FIG. 22 is a sequence diagram illustrating the processing of multidisplay.
Figure 23:
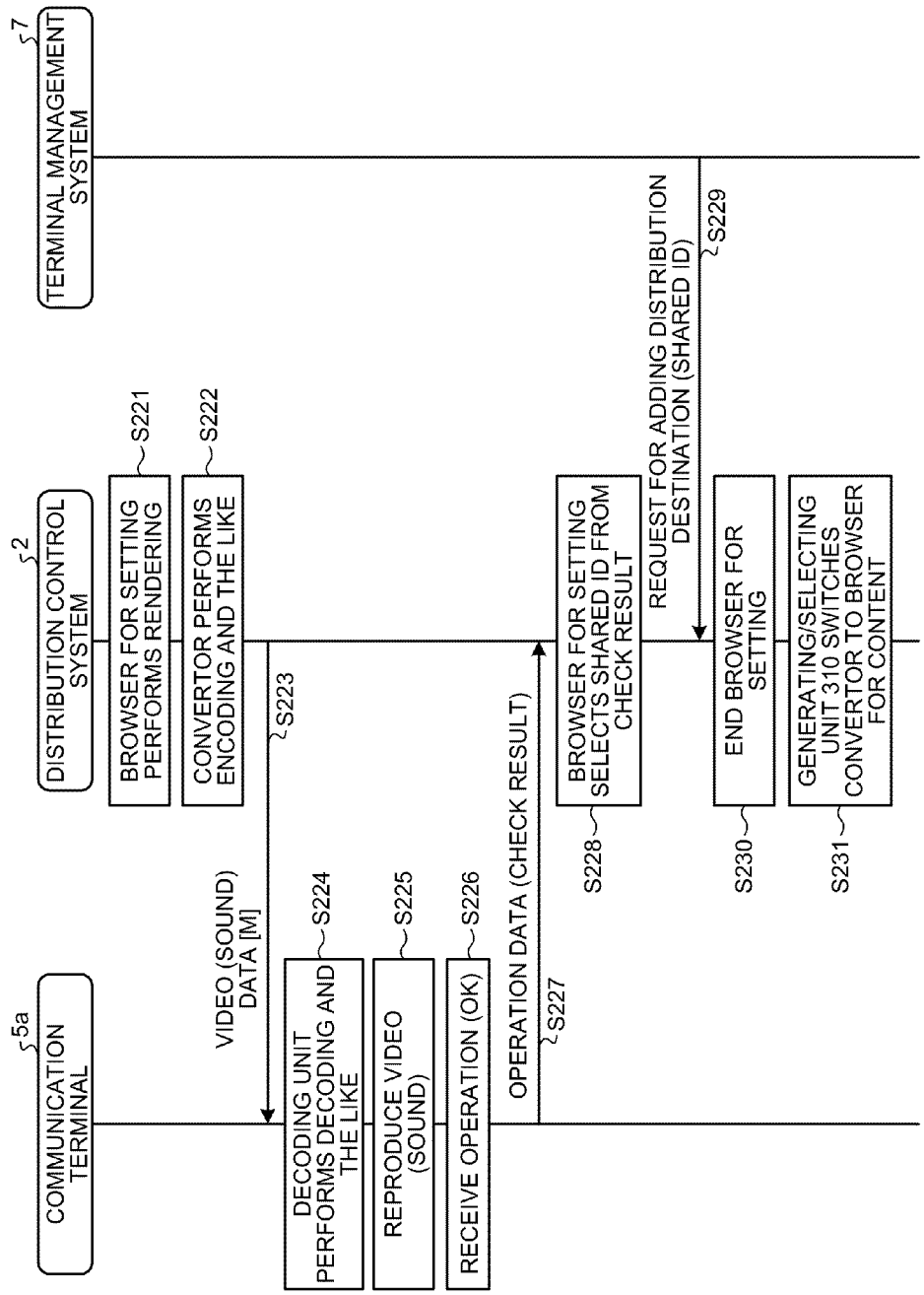
FIG. 23 is a sequence diagram illustrating the processing of multidisplay.
Figure 24:
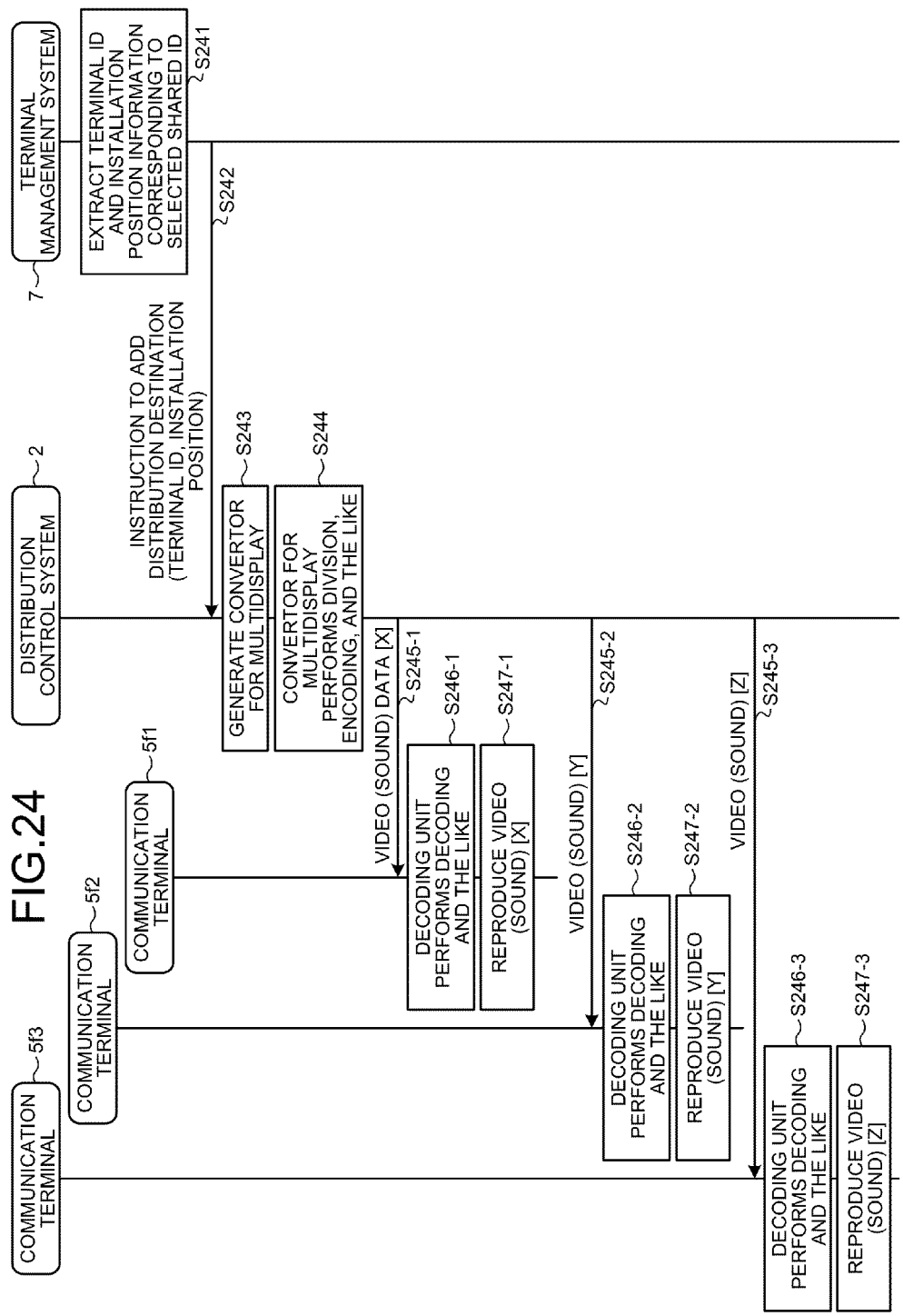
FIG. 24 is a sequence diagram illustrating the processing of multidisplay.

Described next with reference to FIG. 22 to FIG. 24 is the processing of multidisplay. FIG. 22 to FIG. 24 are sequence diagrams illustrating the processing of multidisplay illustrated in FIG. 5.

Described here is an example of reproducing video (sound) [XYZ] being reproduced on the communication terminal 5a also on the communication terminals (5/1, 5/2, 5/3) in a divided manner.

The browser 20 for displaying web content is represented as a "browser 20a", and the browser 20 for displaying a setting screen for a user is represented as a "browser 20b". Described first is processing corresponding to Step S30 in FIG. 17.

First, the browser 20a of the distribution control system 2 renders the web content data [XYZ] acquired from the web server 8, thereby generating pieces of frame data as pieces of still image (sound) data and outputs them to the transmission FIFO 24 (Step S201). The convertor 10 encodes the pieces of frame data stored in the transmission FIFO 24, thereby converting them into video (sound) data [XYZ] of a data format capable of being transmitted to the communication terminal 5a (Step S202).

The transmitter/receiver 31 transmits the video (sound) data [XYZ] after being converted by the convertor 10 to the transmitter/receiver 51 of the communication terminal 5a (Step S203). This causes the transmitter/receiver 51 of the communication terminal 5a to receive the video (sound) data [XYZ] and to output it to the reproduction controller 53.

In the communication terminal 5a, the decoding unit 50 acquires the video (sound) data [XYZ] from the reproduction controller 53 and decodes it (Step S204). After that, the speaker 61 reproduces a sound based on decoded sound data [XYZ], and the display unit 58 reproduces video based on video data [XYZ] acquired from the decoding unit 50 and rendered by the rendering unit 55 (Step S205).

A screen displayed on the display unit 58 is switched to a menu request screen (not illustrated) by the user of the communication terminal 5a, and the operating unit 52 receives the pressing of a "distribution destination selection menu" (not illustrated) on the menu request screen (Step S206). This causes the transmitter/receiver 51 to transmit a request for switching to the distribution destination selection menu to the transmitter/receiver 71a of the terminal management system 7 (Step S207). This causes the transmitter/receiver 71a of the terminal management system 7 to receive the request for switching to the distribution destination selection menu. This request includes the terminal ID of the communication terminal 5a.

The transmitter/receiver 71b transmits a browser 20b startup request to the transmitter/receiver 21 of the distribution control system 2 (Step S208). This causes the transmitter/receiver 21 of the distribution control system 2 to receive the browser 20b startup request and to issue the browser 20b startup request to the browser management unit 22.

The browser management unit 22 starts up the browser 20b (Step S209). The generating/selecting unit 310 of the encoder bridge unit 30 switches the output from the browser 20a to the convertor 10 (e.g., the convertor 10a) to the output from the browser 20b to the convertor 10 (e.g., the convertor 10b) (Step S210). When the communication terminal 5a and another communication terminal 5 (e.g., the communication terminal 5b) are receiving the video (sound) data at Step S203 with the convertor 10 (e.g., the convertor 10a) shared, the generating/selecting unit 310 of the encoder bridge unit 30 newly generates the convertor 10 (e.g., the convertor 10b), because the other communication terminal 5 (e.g., the communication terminal 5b) is using the convertor 10 (e.g., the convertor 10a) for the browser 20a.

The transmitter/receiver 21 transmits a request for a distribution destination selection menu to the transmitter/receiver 71b of the terminal management system 7 in accordance with an instruction by the browser 20b (Step S211). In this situation, the terminal ID of the communication terminal 5a is also transmitted. This causes the transmitter/receiver 71b of the terminal management system 7 to receive the request for a distribution destination selection menu and to output the terminal ID of the communication terminal 5a to the storage unit 7000

In response thereto, the storage unit 7000 of the terminal management system 7 searches the available terminal management table 7020 based on the terminal ID, thereby extracting the corresponding shared ID (Step S212). This shared ID indicates a communication terminal 5 available for the communication terminal 5a to perform remote sharing processing. As illustrated in FIG. 14, because the terminal ID of the communication terminal 5a is "t001", the shared IDs to be extracted are "v003" and "v006".

The storage unit 7000 further searches the terminal management table 7010 based on the extracted shared ID, thereby extracting display name information indicating the corresponding display name (Step S213). As illustrated in FIG. 13, display names corresponding to the extracted shared IDs "v003" and "v006" are "Tokyo head office 10F MFP" and "Osaka exhibition hall 1F multidisplay", respectively.

The transmitter/receiver 71b transmits distribution destination selection menu data [M] as content data to the transmitter/receiver 21 of the distribution control system 2 (Step S214). This causes the transmitter/receiver 21 of the distribution control system 2 to receive the distribution destination selection menu data [M] and to output it to the browser 20b. As illustrated in FIG. 12, this distribution destination selection menu data [M] includes check boxes, shared IDs, and display names.

As illustrated in FIG. 23, the browser 20b renders the content data indicating the distribution destination selection menu data [M] acquired from the terminal management system 7, thereby generating pieces of frame data as pieces of still image (sound) data and outputs them to the transmission FIFO 24 (Step S221). The convertor 10 encodes the pieces of image (sound) data [M] stored in the transmission FIFO 24, thereby converting them into video (sound) data [N] of a data format capable of being transmitted to the communication terminal 5a (Step S222).

The transmitter/receiver 31 transmits the video (sound) data [N] after being converted by the convertor 10 to the transmitter/receiver 51 of the communication terminal 5a (Step S223). This causes the transmitter/receiver 51 of the communication terminal 5a to receive the video (sound) data [M] and to output it to the reproduction controller 53.

In the communication terminal 5a, the decoding unit 50 acquires the video (sound) data [M] from the reproduction controller 53 and decodes it (Step S224). After that, the display unit 58 reproduces video as illustrated in FIG. 12 based on the video data [XYZ] acquired from the decoding unit 50 and rendered by the rendering unit 55 (Step S225).

In the distribution destination selection menu illustrated in FIG. 12, when the check box of the shared ID "v006" is checked and the "OK" button is pressed by the user, the operating unit 52 receives an operation input by the user (Step S226).

The transmitter/receiver 51 transmits a check result as operation data to the transmitter/receiver 31 of the distribution control system 2 (Step S227). This causes the transmitter/receiver 31 of the distribution control system 2 to receive the check result as operation data and to output it to the browser 20b.

The browser 20b selects the shared ID from the check result (Step S228). The transmitter/receiver 21 transmits a request for adding a distribution destination to the transmitter/receiver 71b of the terminal management system 7 in accordance with an instruction by the browser 20b (Step S229). This request for adding a distribution destination includes the shared ID selected at Step S227. This causes the transmitter/receiver 71b of the terminal management system 7 to receive the request for adding a distribution destination and to output the shared ID to the storage unit 7000. The browser 20b then ends its role to end (Step S230). This causes the generating/selecting unit 310 of the encoder bridge unit 30 to return the output from the browser 20b to the convertor 10 to the output from the browser 20a to the convertor 10 (Step S231).

As illustrated in FIG. 24, in the storage unit 7000 of the terminal management system 7, the terminal management table 7010 is searched based on the shared ID sent through Step S229, thereby extracting the corresponding terminal ID and installation position information (Step S241). The transmitter/receiver 71b transmits an instruction to add a distribution destination to the transmitter/receiver 21 of the distribution control system 2 (Step S242). This instruction to add a distribution destination includes the terminal ID and the installation position information extracted at Step S241. This causes the transmitter/receiver 21 of the distribution control system 2 to receive the instruction to add a distribution destination and to output the instruction to add a distribution destination to the browser management unit 22. Included here are three sets of the terminal ID and the installation position information, that is, the terminal ID and the installation position information are "t006" and "left", respectively, the terminal ID and the installation position information are "t007" and "middle", respectively, and the terminal ID and the installation position information are "t008" and "right", respectively.

The generating/selecting unit 310 of the encoder bridge unit 30 generates a convertor 10 for multidisplay (Step S243). In this case, the generating/selecting unit 310 of the encoder bridge unit 30 acquires the terminal ID and the installation position information from the browser management unit 22.

The dividing unit 13 of the convertor 10 generated at Step S243 divides the pieces of frame data [XYZ] as pieces of still image (sound) data stored in the transmission FIFO 24, and the encoding unit 19 encodes the divided pieces of frame data (Step S244).

The transmitter/receiver 31 transmits video (sound) data [X] encoded by the encoder bridge unit 30 to the transmitter/receiver 51 of the communication terminal 5/1 based on the terminal ID ("t006") and the installation position information ("left") (Step S245-1). This causes the transmitter/receiver 51 of the communication terminal 5/1 to receive the video (sound) data [X] and to output it to the reproduction controller 53.

In the communication terminal 5/1, the decoding unit 50 acquires the video (sound) data [X] from the reproduction controller 53 and decodes it (Step S246-1). After that, the speaker 61 reproduces a sound based on decoded sound data, and the display unit 58 reproduces video based on video data [X] acquired from the decoding unit 50 and rendered by the rendering unit 55 (Step S247-1).

Similarly, the transmitter/receiver 31 transmits video (sound) data [Y] encoded by the encoder bridge unit 30 to the transmitter/receiver 51 of the communication terminal 5/2 based on the terminal ID ("t007") and the installation position information ("middle") (Step S245-2). This causes the transmitter/receiver 51 of the communication terminal 5/2 to receive the video (sound) data [Y] and to output it to the reproduction controller 53.

In the communication terminal 5/2, the decoding unit 50 acquires the video (sound) data from the reproduction controller 53 and decodes it (Step S246-2). After that, the speaker 61 reproduces a sound based on decoded sound data [Y], and the display unit 58 reproduces video based on video data [Y] acquired from the decoding unit 50 and rendered by the rendering unit 55 (Step S247-2).

Further similarly, the transmitter/receiver 31 transmits video (sound) data [Z] encoded by the encoder bridge unit 30 to the transmitter/receiver 51 of the communication terminal 5/3 based on the terminal ID ("t008") and the installation position information ("right") (Step S235-3). This causes the transmitter/receiver 51 of the communication terminal 5/3 to receive the video (sound) data [Z] and to output it to the reproduction controller 53.

In the communication terminal 5/3, the decoding unit 50 acquires the video (sound) data [Z] from the reproduction controller 53 and decodes it (Step S246-3). After that, the speaker 61 reproduces a sound based on decoded sound data [Z], and the display unit 58 reproduces video based on video data [Z] acquired from the decoding unit 50 and rendered by the rendering unit 55 (Step S247-3).

Channel Adaptive Control by Changing Parameter Sets

Figure 27:
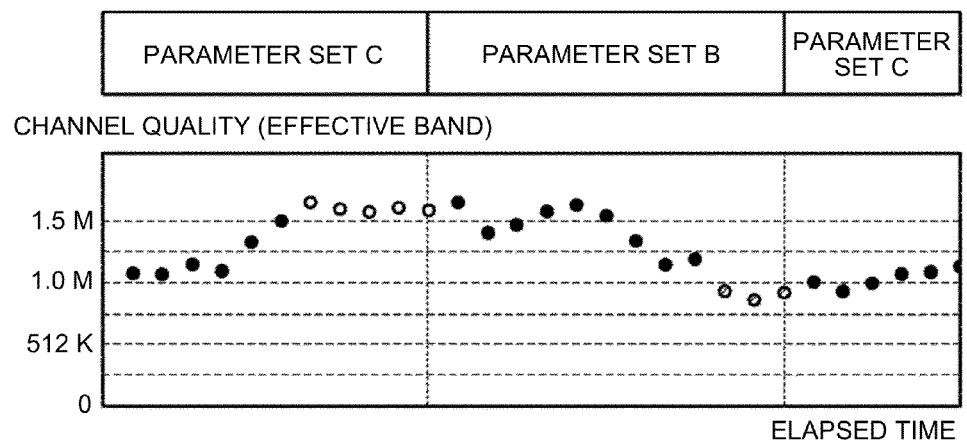
FIG. 27 is a view for illustrating changes of parameter sets when the criteria in FIG. 26 are adopted.

Described next in more detail with reference to FIG. 25 to FIG. 27 is the processing of the upstream channel adaptive control. The present embodiment shows an example in which the channel adaptive controller 27 changes one or more parameters influencing reproduction quality when the communication terminal 5 reproduces video (sound) data in accordance with the quality (e.g., the length of the transmission delay time) of a communication channel of a communication network. Described below in particular is a case of changing a parameter set in which a plurality of parameters are combined. FIG. 25 is a view illustrating an example of parameters included in a parameter set.

The example of the parameter set in FIG. 25 includes five parameters for changing reproduction delay time, target frame rate, resolution (or color depth), and the number of channels when the video (sound) data is video data. The example includes five parameters for changing reproduction delay time, target bit rate, sampling rate, quantization bit rate, and the number of channels when the video (sound) data is sound data. The channel adaptive controller 27 adjusts these parameters within the range of the decoding capability of the communication terminal 5 on the reception side.

When the video (sound) data is the video data, the channel adaptive controller 27 changes the parameters as follows: Namely, when the parameters include the bit rate of the video data, the channel adaptive controller 27 reduces the bit rate as the transmission delay time D is longer. When the parameters include the frame rate of the video data, the channel adaptive controller 27 reduces the frame rate as the transmission time D is longer. When the parameters include the resolution of the video data, the channel adaptive controller 27 reduces the resolution as the transmission delay time D is longer. When the parameters include the color depth of the video data, the channel adaptive controller 27 reduces the color depth as the transmission delay time D is longer. When the parameters include the number of channels, the channel adaptive controller 27 reduces the number of channels as the transmission delay time D is longer.

When the video (sound) data is the sound data, the channel adaptive controller 27 changes the parameters as follows: Namely, when the parameters include the bit rate of the sound data, the channel adaptive controller 27 reduces the bit rate as the transmission delay time is longer. When the parameters include the sampling rate of the sound data, the channel adaptive controller 27 reduces the sampling rate as the transmission delay time is longer. When the parameters include the quantization bit rate of the sound data, the channel adaptive controller 27 reduces the quantization bit rate as the transmission delay time is longer. When the parameters include the color depth of the sound data, the channel adaptive controller 27 reduces the color depth as the transmission delay time D is longer. When the parameters include the number of channels, the channel adaptive controller 27 reduces the number of channels as the transmission delay time D is longer.

When changing the parameters, the channel adaptive controller 27 may change the parameters in accordance with priority about, for example, which parameter is changed first. For example, a parameter is changed first, even when changing the parameter reduces reproduction quality, it is generally difficult for the user of the communication terminal 5 to recognize a decrease in quality. An example of changing a specific parameter is as follows: When sensory evaluation by the user does not change generally even when the frame rate is changed between 30 fps and 15 fps, the frame rate is changed within the range. Another example is as follows: When the video (sound) data includes both video data and sound data, parameters relating to the video are changed first prior to parameters relating to the sound, because a decrease in the quality of the video is generally easy to be recognized. Still another example is as follows: When the video (sound) data includes both video data and sound data, when it is unable to transmit to the communication terminal 5 on the reception side with appropriate quality even when the quality of the video (sound) data is reduced, parameters are changed so that the distribution of the video data is stopped and that only the distribution of the sound data is performed.

The channel adaptive controller 27 may change the parameters in accordance with the selection of the user. In other words, the channel adaptive controller 27 may not uniformly determine parameters for decreasing the reproduction quality of the video (sound) data. For example, when the frame rate is changed between 15 fps and 1 fps, the user of the communication terminal 5 on the reception side is likely to recognize a decrease in the reproduction quality of the video (sound) data. In such a case, the user is allowed to select a parameter that is preferentially adjusted about whether the frame rate should be reduced or another parameter should be reduced. This is because some users think that reducing the frame rate presents no problem when the video (sound) data is content with less motion and others desire to maintain the frame rate even with the target bit rate reduced when output information is content with rapid motion.

Described next is an example of a determination method when the channel adaptive controller 27 determines to change the parameter set. When the quality of the communication channel is an approximate value of a quality determination threshold, when the parameter set used is switched frequently in accordance with slight fluctuations of the quality of the communication channel, smooth reproduction is unable in the communication terminal 5 on the reception side. In view of this, by having different criteria when increasing and decreasing the quality of the parameter set, frequent switching is avoided.

FIG. 26 is a view for illustrating an example of criteria when changing the quality of parameter sets. The example in FIG. 26 includes four parameter sets from a high-quality parameter set A that maximizes the quality of the video (sound) data to a low-quality parameter set D that minimizes the quality of the video (sound) data. In the example in FIG. 26, thresholds when decreasing the quality of the parameter set are set to be smaller than thresholds when increasing the quality of the parameter set. This causes the channel adaptive controller 27 to prevent the switching of the parameter sets from occurring frequently.

FIG. 27 is a view for illustrating changes of parameter sets when the criteria in FIG. 26 are applied. With the parameter set C used currently, when a case in which the quality of the communication channel is 1.5 Mbps continues for a certain time period, the channel adaptive controller 27 changes the parameter set to the parameter set B. After that, even when the quality of the communication channel becomes less than 1.5 Mbps, the channel adaptive controller 27 maintains the parameter set to be the parameter set B, because the threshold when decreasing is 1.0 Mbps or more. When a case in which the quality of the communication channel is less than 1.0 Mbps for a certain time period, the channel adaptive controller 27 changes the parameter set to the parameter set C. Thus, the criteria when increasing and decreasing the quality of the parameter set are different; as a result, the state before change is not easily restored by fluctuations in the quality of the communication channel immediately after the parameter set is changed. Determined appropriately is processing for a case in which the quality of the communication channel is deteriorated to such an extent that appropriate reproduction is unable even when the quality of the parameter is minimized. Examples of the processing for such a case include disconnecting a session and maintaining a session until the quality of the communication channel is recovered.

As described above with reference to the specific example, in the distribution system 1 according to the present embodiment, the distribution control system 2 includes the browser 20 that performs rendering and the encoder bridge unit 30 that performs encoding and the like on the cloud. This causes the browser 20 to perform pieces of frame data as pieces of still image (sound) data based on content data described in a certain description language and the encoder bridge unit 30 to convert the pieces of frame data into video (sound) data capable of being transmitted through the communication network 9. After that, the distribution control system 2 distributes the video (sound) data to the communication terminal 5. As a result, web content can be smoothly reproduced on the communication terminal 5 side without updating its own browser and spending trouble and costs for upgrading the specifications of a CPU, an OS, a RAM, and the like. This eliminates the problem in which enrichment of content increases a load on the communication terminal 5.

In particular, the browser 20 enables real-time communication, and the convertor 10 performs real-time encoding on the frame data generated by the browser 20. Consequently, unlike a case in which a PVC player selects and distributes non real-time (that is, pre-encoded) video (sound) data as seen in, for example, on-demand distribution of video (sound) data, the distribution control system 2 renders content acquired immediately before being distributed, thereby generating pieces of frame data and then encoding it, thus allowing distribution of real-time video (sound) data.

The distribution control system 2 changes the parameters of the reproduction quality of the video (sound) data to be distributed to the communication terminal 5 based on the transmission delay time information received from the communication terminal 5, thereby producing the effect of reproducing data on the communication terminal 5 as smoothly as possible even when the enrichment of content progresses or a communication channel such as the Internet becomes congested.

Supplementary Description

The distribution system 1 according to the present embodiment includes the terminal management system 7 and the distribution control system 2 as separate systems. For example, the terminal management system 7 and the distribution control system 2 may be constructed as an integral system by, for example, causing the distribution control system 2 to have the functions of the terminal management system 7.

The distribution control system 2 and the terminal management system 7 according to the above embodiment may be constructed by a single computer or may be constructed by a plurality of computers in which respective parts (functions, means, or storage units) are divided and assigned arbitrarily.

A storage medium such as a CD-ROM and an HDD storing the programs of the above embodiment can be provided domestically or abroad.

According to the embodiments, based on transmission delay time received from a communication terminal, a distribution control system changes parameters of the reproduction quality of data to be distributed to the communication terminal, thereby producing the effect of reproducing data on the communication terminal as smoothly as possible even when the enrichment of content progresses or a communication channel such as the Internet becomes congested.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A distribution control system for distributing data to a communication terminal through a communication network, the distribution control system comprising:
    a receiver configured to receive, from the communication terminal, transmission delay time information indicating transmission delay time from when the data is distributed by the distribution control system to when the data is received by the communication terminal; and
    a changing unit configured to change, based on the transmission delay time information received by the receiver, a parameter of reproduction quality when the data is reproduced by the communication terminal,
    wherein the data includes at least one of video content or audio data,
    wherein the changing unit is configured such that when the data includes the video content,
        the parameter includes at least one of a bit rate, a frame rate, a resolution, a color depth, or a number of channels of the video content,
        the changing unit is configured to reduce the bit rate as the transmission delay time is longer when the parameter includes the bit rate of the video content,
        the changing unit is configured to reduce the frame rate as the transmission delay time is longer when the parameter includes the frame rate of the video content,
        the changing unit is configured to reduce the resolution as the transmission delay time is longer when the parameter includes the resolution of the video content,
        the changing unit is configured to reduce the color depth as the transmission delay time is longer when the parameter includes the color depth of the video content, and
        the changing unit is configured to reduce the number of channels as the transmission delay time is longer when the parameter includes the number of channels of the video content, and
    wherein the changing unit is configured such that when the data includes the sound content,
        the parameter includes at least one of a bit rate, a sampling rate, a quantization bit rate, or a number of channels of the sound content,
        the changing unit is configured to reduce the bit rate as the transmission delay time is longer when the parameter includes the bit rate of the sound content,
        the changing unit is configured to reduce the sampling rate as the transmission delay time is longer when the parameter includes the sampling rate of the sound content,
        the changing unit is configured to reduce the quantization bit rate as the transmission delay time is longer when the parameter includes the quantization bit rate of the sound content, and
        the changing unit is configured to reduce the number of channels as the transmission delay time is longer when the parameter includes the number of channels of the sound content.

2. The distribution control system according to claim 1, wherein the parameter includes reproduction delay time for delaying reproduction of the first data on the communication terminal.

3. The distribution control system according to claim 2, further comprising a transmitter configured to transmit reproduction delay time information indicating the reproduction delay time to the communication terminal.

4. The distribution control system according to claim 2, wherein the changing unit is configured to make the reproduction delay time longer as the transmission delay time is longer.

5. The distribution control system according to claim 1, wherein the changing unit is configured to change the parameter so that a threshold of the parameter for decreasing the reproduction quality is set to be smaller than a threshold of the parameter for increasing the reproduction quality.

6. The distribution control system according to claim 1, wherein the changing unit is configured to change a parameter set in which a plurality of parameters are combined in accordance with a length of the transmission delay time.

7. The distribution control system according to claim 6, wherein the parameter set is a combination of a first parameter and a second parameter,
    the changing unit is configured to change the second parameter so that the first parameter does not exceed a threshold when changing the first parameter to decrease the reproduction quality.

8. A distribution control method executed by a distribution control system for distributing data to a communication terminal through a communication network, the distribution control method comprising:
    receiving, from the communication terminal, transmission delay time information indicating transmission delay time from when the data is distributed by the distribution control system to when the data is received by the communication terminal; and
    changing, based on the transmission delay time information received at the receiving, a parameter of reproduction quality when the data is reproduced by the communication terminal,
    wherein the data includes at least one of video content or sound content,
    wherein, when the data includes the video content,
        the parameter includes at least one of a bit rate, a frame rate, a resolution, a color depth, or a number of channels of the video content, the changing unit is configured to reduce the bit rate as the transmission delay time is longer when the parameter includes the bit rate of the video content, the changing unit is configured to reduce the frame rate as the transmission delay time is longer when the parameter includes the frame rate of the video content, the changing unit is configured to reduce the resolution as the transmission delay time is longer when the parameter includes the resolution of the video content, the changing unit is configured to reduce the color depth as the transmission delay time is longer when the parameter includes the color depth of the video content, and the changing unit is configured to reduce the number of channels as the transmission delay time is longer when the parameter includes the number of channels of the video content, and wherein, when the first data includes the sound content, the parameter includes at least one of a bit rate, a sampling rate, a quantization bit rate, or a number of channels of the sound content, the changing unit is configured to reduce the bit rate as the transmission delay time is longer when the parameter includes the bit rate of the sound content, the changing unit is configured to reduce the sampling rate as the transmission delay time is longer when the parameter includes the sampling rate of the sound content, the changing unit is configured to reduce the quantization bit rate as the transmission delay time is longer when the parameter includes the quantization bit rate of the sound content, and the changing unit is configured to reduce the number of channels as the transmission delay time is longer when the parameter includes the number of channels of the sound content.

9. A non-transitory computer-readable storage medium with an executable program stored thereon and executed by a computer, wherein the program instructs the computer to perform the distribution control method according to claim 8.

10. A distribution control system for distributing first data to a communication terminal through a communication network, the distribution control system comprising:

a receiver configured to receive, from the communication terminal, time from when the data is distributed by the distribution control system to when the data is received by the communication terminal; and a changing unit configured to change, based on the time received by the receiver and a size of the data, operation of a convertor configured to convert the data into data to be distributed, wherein the data includes at least one of video content or sound content, wherein the changing unit is configured such that when the data includes the video content, the parameter includes at least one of a bit rate, a frame rate, a resolution, a color depth, or a number of channels of the video content, the changing unit is configured to reduce the bit rate as the transmission delay time is longer when the parameter includes the bit rate of the video content, the changing unit is configured to reduce the frame rate as the transmission delay time is longer when the parameter includes the frame rate of the video content, the changing unit is configured to reduce the resolution as the transmission delay time is longer when the parameter includes the resolution of the video content, the changing unit is configured to reduce the color depth as the transmission delay time is longer when the parameter includes the color depth of the video content, and the changing unit is configured to reduce the number of channels as the transmission delay time is longer when the parameter includes the number of channels of the video content, and wherein the changing unit is configured such that when the data includes the sound content, the parameter includes at least one of a bit rate, a sampling rate, a quantization bit rate, or a number of channels of the sound content, the changing unit is configured to reduce the bit rate as the transmission delay time is longer when the parameter includes the bit rate of the sound content, the changing unit is configured to reduce the sampling rate as the transmission delay time is longer when the parameter includes the sampling rate of the sound content, the changing unit is configured to reduce the quantization bit rate as the transmission delay time is longer when the parameter includes the quantization bit rate of the sound content, and the changing unit is configured to reduce the number of channels as the transmission delay time is longer when the parameter includes the number of channels of the sound content.

* * * * *